United States Patent
Panzer

(10) Patent No.: US 8,244,815 B1
(45) Date of Patent: *Aug. 14, 2012

(54) ENABLING ELECTRONIC LOGGING THROUGH AN INSTANT MESSAGE SYSTEM

(76) Inventor: John Panzer, Mountain View, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 12/498,205

(22) Filed: Jul. 6, 2009

Related U.S. Application Data

(63) Continuation of application No. 10/747,677, filed on Dec. 30, 2003, now Pat. No. 7,558,828.

(60) Provisional application No. 60/473,926, filed on May 29, 2003, provisional application No. 60/488,398, filed on Jul. 21, 2003.

(51) Int. Cl.
*G06F 15/16* (2006.01)

(52) U.S. Cl. .................. 709/206; 709/204; 709/205

(58) Field of Classification Search .................. 709/206
See application file for complete search history.

(56) References Cited

U.S. PATENT DOCUMENTS

| | | | |
|---|---|---|---|
| 5,963,913 A * | 10/1999 | Henneuse et al. | 705/7.13 |
| 6,138,149 A * | 10/2000 | Ohmura | 709/218 |
| 6,360,250 B1 * | 3/2002 | Anupam et al. | 709/204 |
| 6,393,461 B1 | 5/2002 | Okada et al. | |
| 6,430,602 B1 | 8/2002 | Kay et al. | |
| 6,484,196 B1 | 11/2002 | Maurille | |
| 6,525,747 B1 | 2/2003 | Bezos | |
| 6,567,843 B1 * | 5/2003 | Schumacher | 709/203 |
| 6,741,990 B2 | 5/2004 | Nair et al. | |
| 6,745,238 B1 | 6/2004 | Giljum et al. | |
| 6,791,582 B2 * | 9/2004 | Linsey et al. | 715/751 |
| 7,162,696 B2 * | 1/2007 | Wakefield | 715/716 |
| 7,272,223 B2 | 9/2007 | McCormack et al. | |
| 7,272,633 B2 | 9/2007 | Malik et al. | |
| 2002/0143812 A1 * | 10/2002 | Bedingfield | 707/511 |
| 2003/0163519 A1 * | 8/2003 | Kegel et al. | 709/203 |
| 2003/0208545 A1 | 11/2003 | Eaton et al. | |
| 2004/0078424 A1 | 4/2004 | Yairi et al. | |
| 2004/0260701 A1 * | 12/2004 | Lehikoinen et al. | 707/10 |
| 2005/0004993 A1 * | 1/2005 | Miller et al. | 709/207 |
| 2005/0050460 A1 * | 3/2005 | Bedingfield, Sr. | 715/513 |
| 2005/0273503 A1 * | 12/2005 | Carr et al. | 709/219 |
| 2006/0004914 A1 | 1/2006 | Kelly et al. | |
| 2006/0036689 A1 * | 2/2006 | Buford et al. | 709/206 |
| 2006/0294189 A1 | 12/2006 | Natarajan et al. | |
| 2008/0021970 A1 | 1/2008 | Werndorfer et al. | |

OTHER PUBLICATIONS

Office Action mailed Oct. 12, 2007 in U.S. Appl. No. 10/747,677 (27 pages).

Office Action mailed Apr. 25, 2008 in U.S. Appl. No. 10/747,677 (24 pages).

Notice of Allowance mailed Mar. 3, 2009 in U.S. Appl. No. 10/747,677 (8 pages).

* cited by examiner

*Primary Examiner* — Jeffrey Pwu
*Assistant Examiner* — Shaq Taha
(74) *Attorney, Agent, or Firm* — Finnegan, Henderson, Farabow, Garrett & Dunner LLP

(57) ABSTRACT

Enabling electronic logging using an instant message system includes identifying an interactive agent to an instant message (IM) host system under a first screen name, receiving multiple IMs addressed to the first screen name, the IMs being received from multiple users identifiable to the IM host system, and for each of at least some received, IMs addressed to the first screen name determining which one of the multiple users sent the IM, identifying a web log associated with the user who sent the IM, and adding the contents of the IM to the identified web log.

26 Claims, 14 Drawing Sheets

ENABLING ELECTRONIC LOGGING THROUGH AN INSTANT MESSAGE SYSTEM

CROSS REFERENCE TO RELATED APPLICATIONS

This application is a continuation of U.S. application Ser. No. 10/747,677, filed Dec. 30, 2003, titled ENABLING ELECTRONIC LOGGING USING AN INSTANT MESSAGE SYSTEM and further claims priority from U.S. Application No. 60/473,926, filed May 29, 2003, titled ENABLING ELECTRONIC LOGGING THROUGH AN INSTANT MESSAGING INTERFACE, and U.S. Application No. 60/488,398, filed Jul. 21, 2003, titled ENABLING ELECTRONIC LOGGING THROUGH AN INSTANT MESSAGE COMMUNICATIONS SYSTEM, all of which are incorporated by reference.

TECHNICAL FIELD

The following description relates generally to instant message communications and, more particularly, to the use of instant message communications for electronic logging.

BACKGROUND

Many people enjoy writing in journals. Some people like to share their journals with others. The Internet enables the sharing of online journals through a tool generally known as electronic logging. Electronic logging is sometimes referred to as web logging or blogging.

SUMMARY

In one general aspect, enabling electronic logging using an instant message system includes identifying an interactive agent to an instant message (IM) host system under a first screen name and receiving multiple IMs addressed to the first screen name, the IMs being received from multiple users identifiable to the IM host system. For each of at least some received IMs addressed to the first screen name, it is determined which one of the multiple users sent the IM. The identity of a web log associated with the user who sent the IM is determined, and the contents of the IM are added to the identified web log.

Implementations may include one or more of the following features. For example, the web log may be displayed in a web page publicly accessible through the Internet. The displayed web log may be password protected. In some cases, the web log may be a regularly updated online journal including information of interest to an author of the web log.

The contents of the IM may be formatted as they are added to the web log. Such formatting may include adding a time stamp to the web log entry.

Implementations also may involve permitting multiple IM users to send IMs to a common IM agent. Further, the multiple users that send IMs addressed to the IM agent may be identifiable to the IM host system by unique screen names, such that the identity of a user who sent a particular IM to the agent may include the unique screen name of that user. Determining the identity of a web log associated with the user who sent the IM may involve querying a database with the unique screen name of the user who sent the IM. In identifying a web log associated with the user who sent the IM, it may be determined whether the user has two or more web logs. If the user has two or more web logs, the user may be prompted to identify one of the web logs.

After adding the contents of the IM to the identified web log, a reply message may be generated and sent to the user who sent the IM. The reply message may indicate that the contents of the IM were successfully added to the web log as a web log entry. The reply message may be generated according to the type of communications device used to send the IM, and it may notify the user that he or she can edit or append to the web log entry.

The interactive agent also may include software configured to process entries for inclusion in web log pages displayed on the Internet. The software may be configured to distinguish among the multiple users identifiable to the IM host system on the basis of the unique screen name associated with each of the multiple users.

In another general aspect, entries are added to a web log through an instant message system. Adding entries involves identifying an interactive agent to an IM host system under a first screen name and receiving an IM addressed to the first screen name, wherein the IM may be from any of at least two users identifiable to the IM host system. The user who sent the IM is determined, and a web log associated with that user is identified. The contents of the IM are added the identified web log.

In another general aspect, creating a web log through an instant message system involves logging a web log agent into an IM system under an IM screen name. An IM is received from a user logged into the IM system. It is determined whether the user has a web log. If the user does not have a web log, a web log is created for the user, the IM screen name of the web log agent is added to a buddy list associated with the user, and the contents of the IM are added to the created web log. The contents of the IM may include text, pictures, audio, and/or video.

Some implementations for creating the web log include making the screen name of the web log viewable in the buddy list of the creating user. The screen name may be made to be persistent in the buddy list.

In creating a web log for the user, implementations may involve displaying a creation window that allows the user to enter information about the web log, and storing the information about the web log in a database. The information about the web log may include identification of other users of the IM system as contributing editors on the web log. Each of the contributing editors may be identified by an IM screen name associated with the contributing editor. In creating a web log for the user, the user may be prompted (e.g., y sending an IM to the user) for a title to be associated with the web log and/or for a description to be associated with the web log. The web log title and web log description may be received through the IM system. In some implementations, the buddy list of the user may be enabled to visually indicate the availability of the web log agent to receive IMs from the user.

In another general aspect, enabling web logging by one or more instant message users through an instant message agent involves making an IM agent identifiable to an IM host system. The agent is configured to receive IMs sent by multiple IM users. For each received IM, the agent is configured to identify a web log associated with the IM user who sent the received IM, and store the received IM as a web log entry in the identified web log.

A database may be used to store help messages associated with the agent. The agent also may be configured to send help messages to each of the multiple users identifiable to the IM host system.

These general and specific aspects may be implemented using a system, a method, or a computer program, or any combination of systems, methods, and computer programs.

Other features will be apparent from the description and drawings, and from the claims.

DETAILED DESCRIPTION

Figure 1:
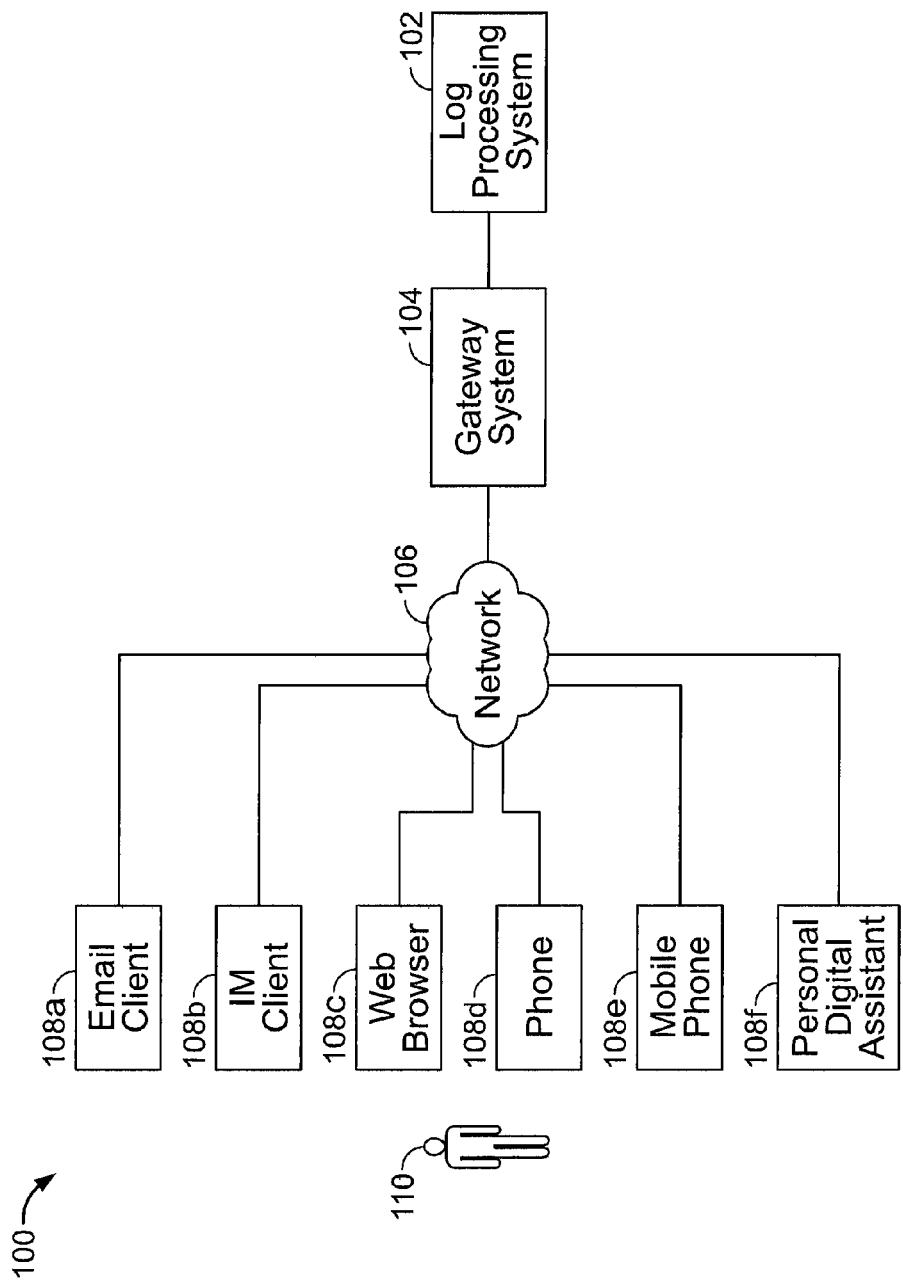
FIG. 1 is a high-level block diagram of an electronic logging system.

An instant message (IM) agent system is provided to enable multiple users of an IM system to create, update, and edit web logs through a single, common or shared interactive interface. In one implementation, multiple IM users identifiable to the IM system by a unique identifier, also called a user name or a screen name, separately add entries to their respective web logs by sending IMs to an interactive IM agent ("bot") provided by the IM agent system and identifiable to the IM system under a single, commonly referenced and user-generic identifier ("screen name"), such as MyWebLog Bot or MyJournal Bot. The use of a single agent screen name for multiple users simplifies and facilitates the process of creating and updating web logs. For example, a first IM user can add a web log entry to the first user's web log by sending an IM to MyWebLog Bot. Likewise, a second IM user can add a web log entry to the second user's web log by sending an IM to the same IM agent, namely MyWebLog Bot. Thus, IM users can leverage an IM system to add web log entries without being required to configure or personalize an IM agent.

In one implementation, an IM agent with a user-generic screen name is capable of receiving IMs from more than one IM user, associating each received IM with a web log of the IM user that sent the IM, and creating a web log for an IM user if one cannot be identified. Thus, the IM agent is capable of creating web logs for multiple users and associating each web log with the particular user who created the web log. For example, if a user without an existing web log sends an IM to the interactive IM agent, the agent determines that the user does not have a web log and sends a reply IM to the user asking if the user wishes to create a web log. Alternatively, the agent automatically creates the web log in response to the receipt of an IM and without user direction or authorization. In one implementation, the agent notifies the user that it has created a web log for the user. In another implementation, a web log is created automatically when the user adds the screen name of the agent to the user's buddy list.

User web logs generally are chronologically organized web pages that are updated on a regular basis to reflect the personal thoughts of the web log author. Often such web logs are updated weekly or daily, displaying web log entries with the most recent entry listed first. Implementation of a web log may be of a personal nature, such as the maintenance of online journals, or a topical nature, such as the provision of frequent news updates. For example, web logs may serve as online forums for individuals to voice opinions and share personal experiences, or they may used to provide frequent news posts from reporters in the field covering events such as military conflicts. In one implementation, web logs are published to the Internet, and are publicly viewable to anyone with Internet access. Alternatively, the published web logs can be implemented with password protection or other such protection to restrict access to the web logs to a selected subgroup of Internet users. In addition to textual information and embedded hypertext links, web logs can display pictures, audio clips, graphics, and/or video clips.

Other examples of web logs include community logs posting notices about community events, family web logs allowing relatives to share personal news, and logs sharing high-tech, financial, or other topical insights by industry experts. Businesses often capitalize on the community-building nature of web logs to offer a bi-directional forum to customers about products and services. Because web logs often focus on specific subjects (e.g., entertainment, sports, health, technology, hobbies) and attract people with mutual interests, web logs also provide marketing tools to reach target audiences. A cooking web log hosted by well-known chefs, for example, may offer advice and reviews on various kitchen tools to an audience likely to purchase such tools.

The interactive IM agent can be implemented in a combination of hardware and software, locally or remotely connected, using any IM system. Examples of such IM systems include, but are not limited to, AIM (America Online Instant Messenger), Yahoo Messenger, MSN Messenger, and ICQ. The IM agent is capable of adding entries using any web-based language, such as, for example, HTML (HyperText Markup Language), XML (Extensible Markup Language), and VoiceXML. Additional information on IM systems may be found in How the Internet Works by Preston Gralla, which is incorporated by reference. In general, however, an IM user logs into an IM host system (see FIG. 2) using an identifier ("screen name") that uniquely identifies the user to the IM host system. Once logged in, the user can send IMs to other IM users ("buddies") that currently are logged into or otherwise identifiable to the IM host system. Each user can create a list of screen names of other IM users, called a buddy list, which is viewable by the creating user. Because each user currently logged into the system is identifiable to the IM host system, the system can provide an indication in the buddy list of which buddies currently are available to receive IMs. For example, the buddy list can denote the presence of a particular buddy currently identifiable to the IM host system by shading or coloring the screen name of that buddy. Alternatively, the presence of buddies can be displayed by arranging the screen names of buddies into buddy list groups, such as an "offline" group and an "online" group.

These and other features will be described now with reference to the drawings identified above. The drawings and their associated descriptions are provided to illustrate various implementation-specific details, and not to limit the scope of the appended claims. For the sake of explanation, some drawings may illustrate concepts as embodying separate components. As understood by one of ordinary skill, however, the substitution of a single component for the shown components does not necessarily render the substitution different from the shown implementation. Additionally, for simplicity, the drawings may show some components as single entities when, as understood by one of ordinary skill, such components may be implemented in multiple instances of the components. For example, a server or database may be illustrated as a single entity though implemented across multiple servers or databases.

FIG. 1 is a high-level block diagram of one implementation of an electronic logging system 100. The electronic logging system 100 includes a log processing system 102, a gateway system 104, a network 106, and one or more user access tools 108. The log processing system 102 is configured to handle the creation of web logs and the addition of web log entries to existing web logs. The gateway system 104, which is configured to handle communications from one or more user access tools 108, connects to and serves as a gateway to the log processing system 102. The gateway system 104 communicates with each of the user access tools 108 through the network 106. In other implementations the gateway system 104 also communicates with the log processing system 102 through the network 106. The gateway system 104 may include one or more of an IM agent system, an audio system, an audio-to-text system, an email system, a web browser system, or another system specifically designed for access by other user access tools 108.

The network 106 is any communications network capable of interfacing with the particular user access tool 108 employed by the user 110 to access the electronic logging system 102 through the gateway system 104. Examples of the network 106 include the Internet, a phone network, or a wireless communication network.

The user access tools 108 are configured to communicate with the gateway system 104, and include, for example, an email client 108a, an IM client 108b, a web browser 108c, a phone 108d, a mobile phone 108e, a personal digital assistant 108f, and other such communication tools. For instance, where the gateway system 104 is an IM agent system 204 (see FIG. 2) configured to enable multiple users of an IM system to create, update, and edit their individual web logs through a single, common interactive interface, the particular user access tool 108 employed by the user 110 may be an IM client 108b.

Figure 2:
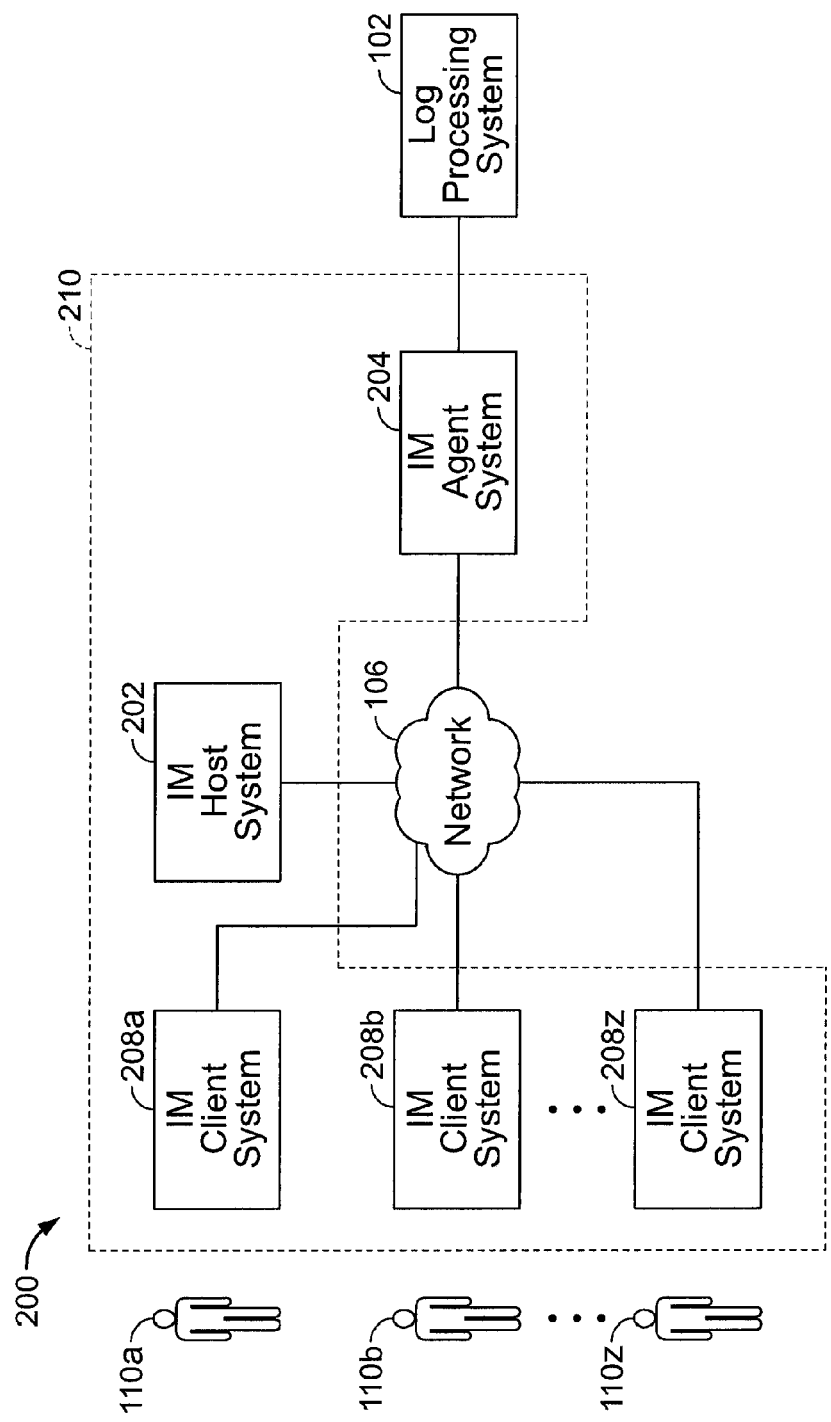
FIG. 2 is a block diagram of an electronic logging system incorporating an IM agent system.

Specifically, FIG. 2 illustrates an electronic logging system 200 incorporating an interactive IM agent system 204 as the gateway to the log processing system 102. The log processing system 102 is connected to the IM agent system 204, and is configured to respond to communications from the IM agent system 204. For example, if the IM agent system 204 requests the identification of all web logs associated with a particular user 110a, the log processing system 102 returns information identifying all such web logs to the IM agent system 204. If no such web logs exist, the log processing system 102 can respond to the IM agent system 204 with an indication that no such web log exists. The log processing system 102 is configured further to process web log entries for addition to existing or newly created web logs.

Figure 5A:
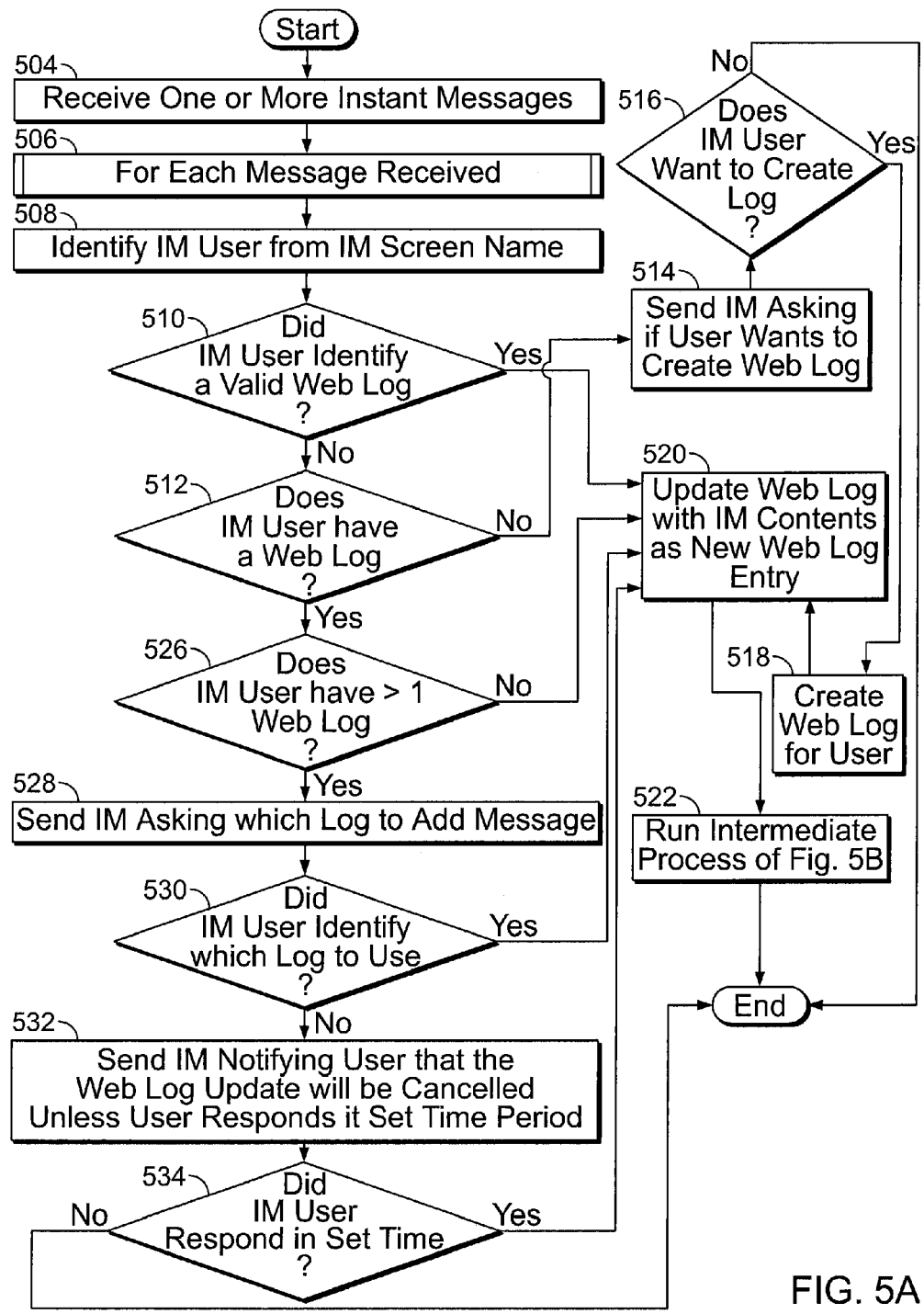
FIGS. 5A and 5B are flow charts illustrating a method of adding an entry to an electronic log.

The IM agent system 204 is identifiable to an IM host system 202 through an IM agent screen name (see discussion of FIG. 5A). The IM agent system 204 and the IM host system 202 are part of the IM system 210. IM system 210 also may include multiple IM client systems 208a-208z that are identifiable to the IM host system 202 through distinct screen names. For clarification, the letter "z" is used as a placeholder only, and is meant to represent that any number (not just twenty-six) of IM client systems can be included in the IM system 210. Each of the IM client systems 208a-208z generally is associated with a corresponding user 110a-110z. Again, for clarification, the letter "z" is a placeholder only, and is meant to represent that any number (not just twenty-six) of users can use the IM system 210 at the same time. For example, two users 110a and 100b, are identifiable to the IM host system 202 through their respective IM client systems 208a and 208b as a result of their associated and distinct IM screen names. Thus, in this example, three separate entities, namely the IM agent system 204, the user 110a, and the user 110b, are known to the IM host system 202 and are identifiable by their unique screen names.

Figure 9:
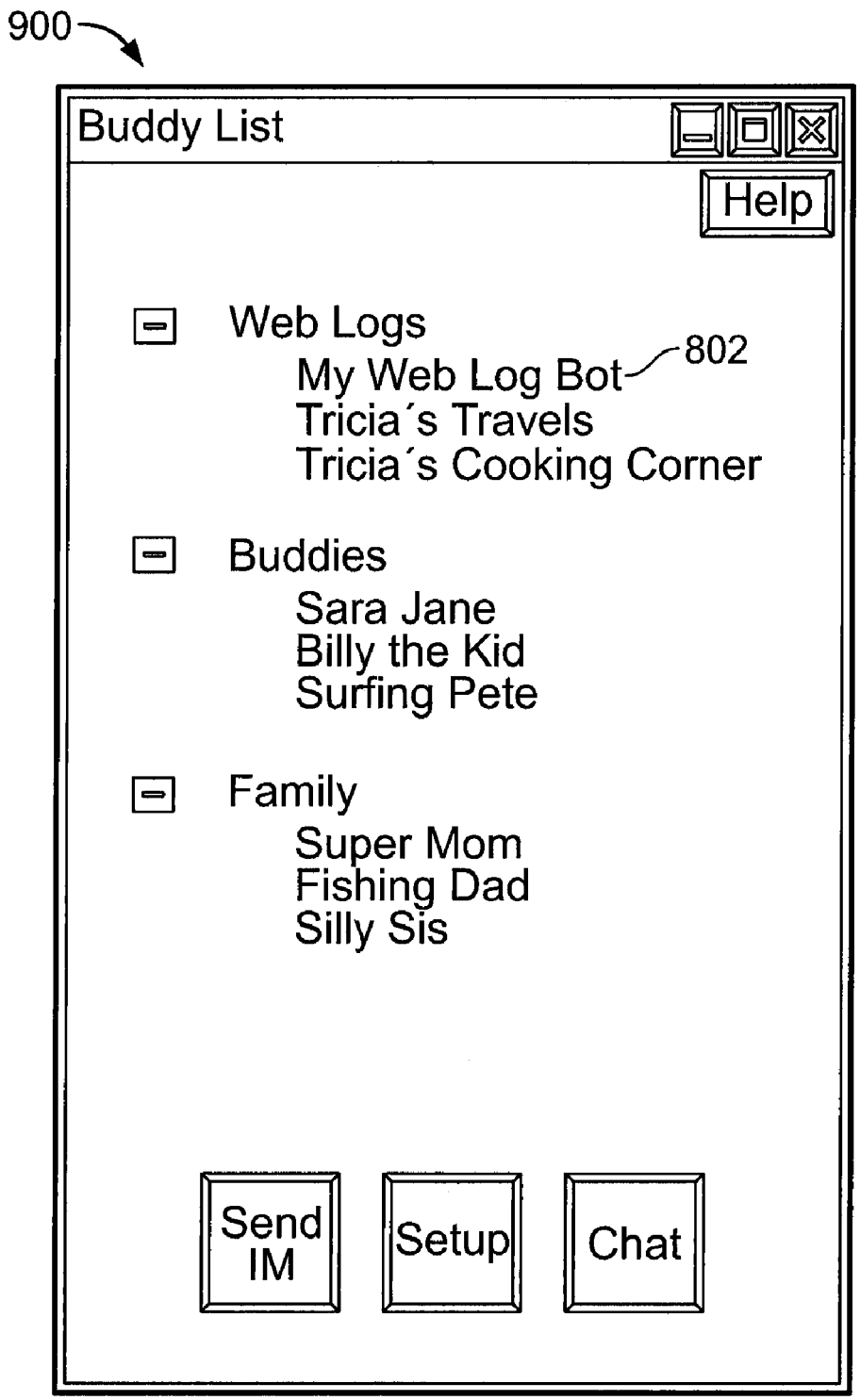

Each of the identifiable entities can receive information indicating the presence of the other entities currently identifiable to the IM host system 202. Notably, both the user 110a and the user 110b receive presence information regarding the same IM agent system 204 identified by the same screen name, such as "MyWebLog Bot." Such presence information can be provided through the buddy list of each entity. For example, the user 110a and the user 110b each may have a buddy list, such as the one depicted in FIG. 9, to monitor the presence of specified entities with respect to the IM host system 202, and thus to monitor the availability of those entities to receive IMs. As shown in FIG. 9, the buddy list contains a screen name for the IM agent system 204 showing its presence with respect to the IM host system 202.

The IM host system 202 is configured to facilitate IMs and other communications between the users 110a and 110b and the IM agent system 204. The users 110a and 110b send IMs using their associated IM client systems 208a and 208b, which are configured to send and receive IMs with other entities identifiable to the IM host system 202. The IM client systems 208a-208z can be implemented on any electronic device capable of understanding the IM protocol, including, but not limited to, personal computer systems, personal digital assistants (PDAs), or web-enabled mobile phones. Communications (including IMs and system level communications) between the IM client systems 208a-208z, the IM agent system 204, and the IM host system 202 travel through the network 106. After receiving the IMs from the users 110a and 110b, the IM agent system 204 interfaces with the log processing system 102 to enable the users 110a and 110b to create web logs or add entries to existing web logs.

Even though the IM agent system 204 enables the user 110a and the user 110b to add entries to their own respective web logs, the screen name for the agent system 204 is shared or common to both the user 110a and the user 110b. For instance, the buddy list of the user 110a and the buddy list of the user 110b both can include the screen name of the same IM agent system 204, such as "MyWebLog Bot." Both the user 110a and the user 110b can add entries to their respective web logs by sending IMs to the "MyWebLog Bot" screen name. Thus, an IM from the user 110a to "MyWebLog Bot" adds the IM entry to the individual web log of the user 110a. Likewise, an IM from the user 110b to "MyWebLog Bot" adds the IM entry to the web log of the user 110b, which differs from the web log of the user 110a.

Figure 3:
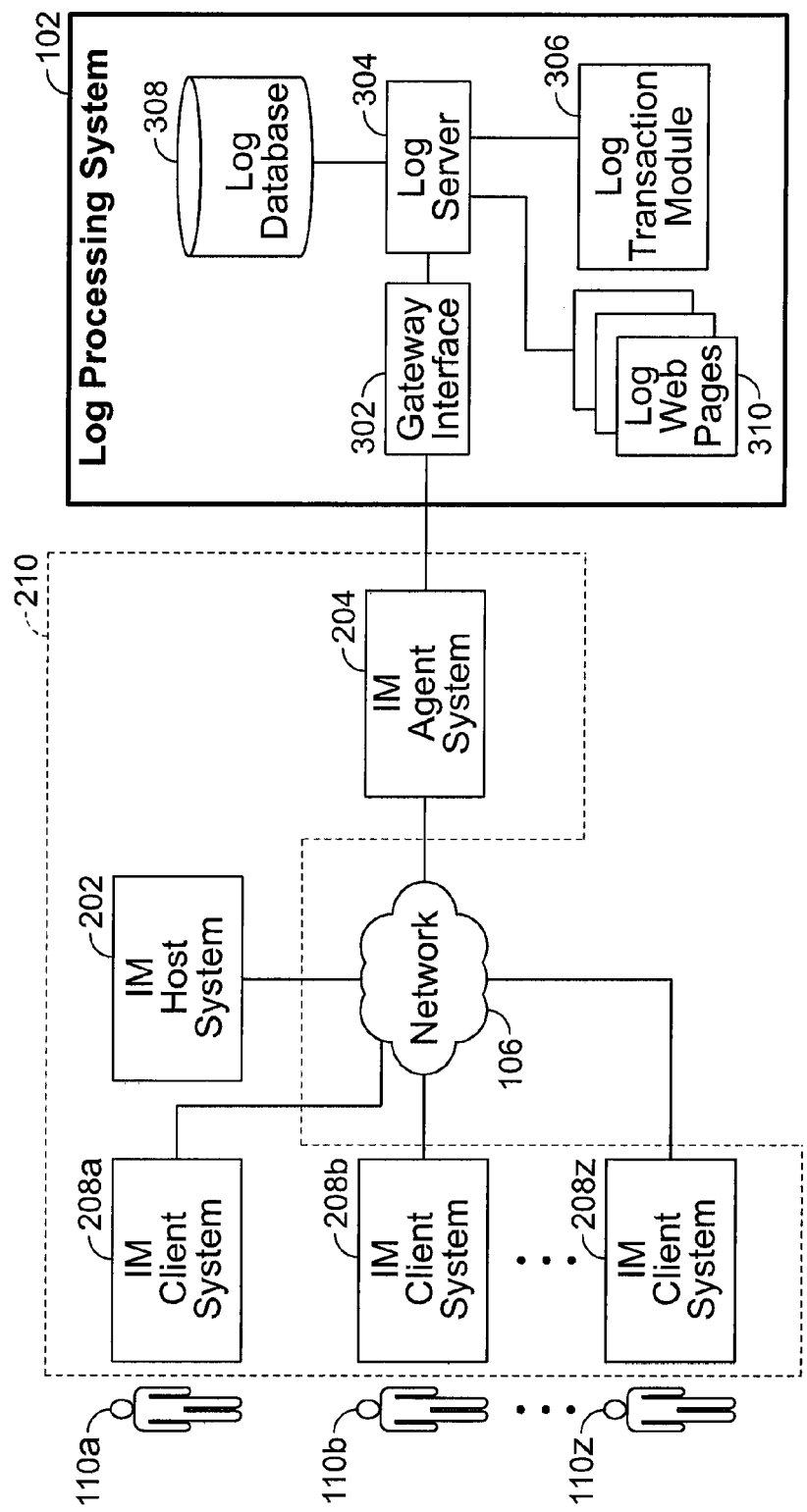
FIGS. 3 and 4 are expansions of the block diagram in FIG. 2.

FIG. 3 shows the log processing system 102 in greater detail. The log processing system 102 includes a gateway interface 302, a log server 304, a log transaction module 306, and a log database 308. The system 102 further includes one or more web pages 310 for displaying web logs on the Internet. The gateway interface 302, the log transaction module 306, the log database 308, and the web pages 310 reside on the log server 304. The log server 304 may be a single server or multiple servers directly or indirectly connected to each other. In one implementation, the log server 304 includes multiple distributed servers connected to each other through a communications network, such as the network 106. Alternatively, certain components depicted in FIG. 3, such as the log web pages 310 and/or the log database 308, may reside on other computer servers that do not form a part of the log processing system 102. The log processing system 102 interfaces with external systems, such as an email system, a photo album system, or an Internet server system, as needed, to carry out its functions as described below.

The gateway interface 302 is configured to communicate with the various gateway systems, such as the IM agent system 204, that may access the log processing system 102. As illustrated in FIG. 3, the gateway interface 302 generally receives communications from the IM agent system 204 and directs those communications to the log transaction module 306. The log transaction module 306 is configured to handle system events and process communications from the IM agent system 204 (using the gateway interface 302).

The log transaction module 306 processes communications according to the type of log transaction requested. Examples of the types of log transactions that may be requested include create requests, delete requests, requests to add entries to an existing web log, and requests to query the log database 308. For instance, in one implementation, the user 110a may send an IM to the IM agent system 204 to request addition of a web log entry to a specified web log. The IM agent system 204 may forward the request to the gateway interface 302, which in turn forwards the request to the log transaction module 306. The request then is processed according to logic routines in the log transaction module 306. Those routines involve formatting the entry for display according to a default or user-customized web log layout. Additionally, the log transaction module 306 can perform other optional operations such as spell checking the text of the entry, filtering inappropriate words from the entry, checking for stale or outdated web logs, and sending notifications to the users 110a-110z about the outdated web logs. In other implementations, some of the transaction processing is performed by the IM agent system 204. For example, the IM agent system 204 may perform preliminary formatting to provide the request in a format understandable to the log processing system 102.

In yet other implementations, the IM agent system 204 is configured merely as a relay system to forward messages from users 110a-110z to the log processing system 102. In such an implementation, the log transaction module 306 determines the type of transaction needed and processes the message accordingly. For example, if the log transaction module 306 determines that a message contains an entry to be added to an existing web log, the log transaction module 306 may identify the web log and update the web log with the new web log entry by storing the entry in the log database 308. If the log transaction module 306 determines that no web log exists for the particular user who sent the message, the module 306 may create a default web log and add the message as a first entry to the newly created web log.

The log database 308 is configured to store web log entries as well as to provide reporting and general information for each web log. For example, for any given web log, the log database 308 can store information such as the date the log was created, the date the log was last updated, and the online layout/styles for the web log. Other stored information may include the web log title, the screen name of the web log owner, a web log identifier (ID), a list of screen names for other IM users authorized to add and edit web log entries, the email address of the web log owner, a web log description, and the time zone of the web log owner. The log database 308 also may store an indicator of whether to display a guest book and whether to allow visitors to the web log to enter comments on the web log. In one implementation, web log owners who have chosen to allow visitors to make comments on their web log can delete individual comments and block specific IM users from making future comments. In such a case, the database 308 maintains a list of screen names of IM users blocked from commenting for each web log. Any pictures, audio, video, and graphical images incorporated into the web log also are stored in the log database 308.

Figure 11:
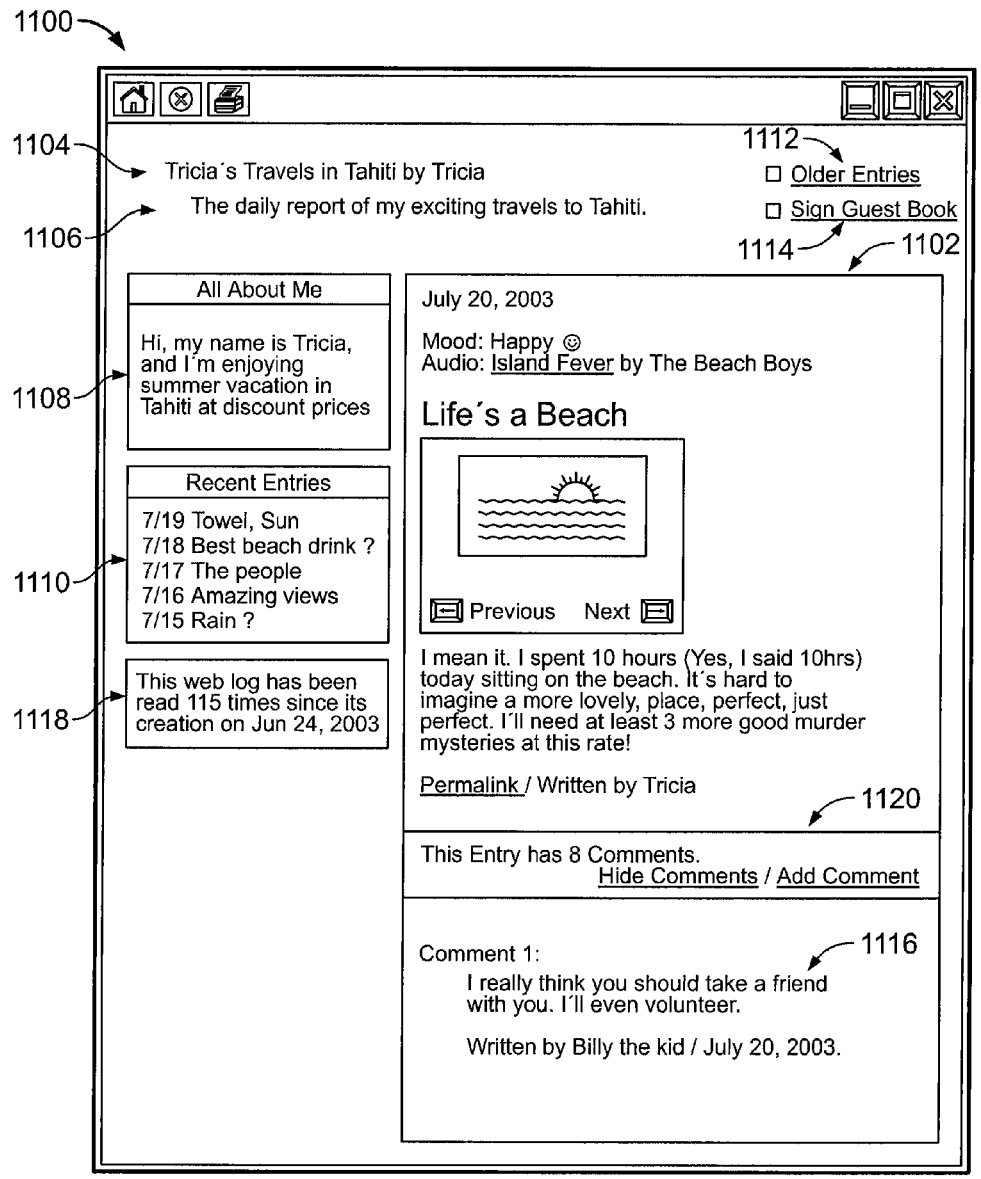

The Web pages 310 are configured to display the web logs of each of the users 110a-110z according to the default or user-customized format specified by each of the users 110a-110z. FIG. 11 depicts an exemplary web log displayed on the Internet.

Figure 4:
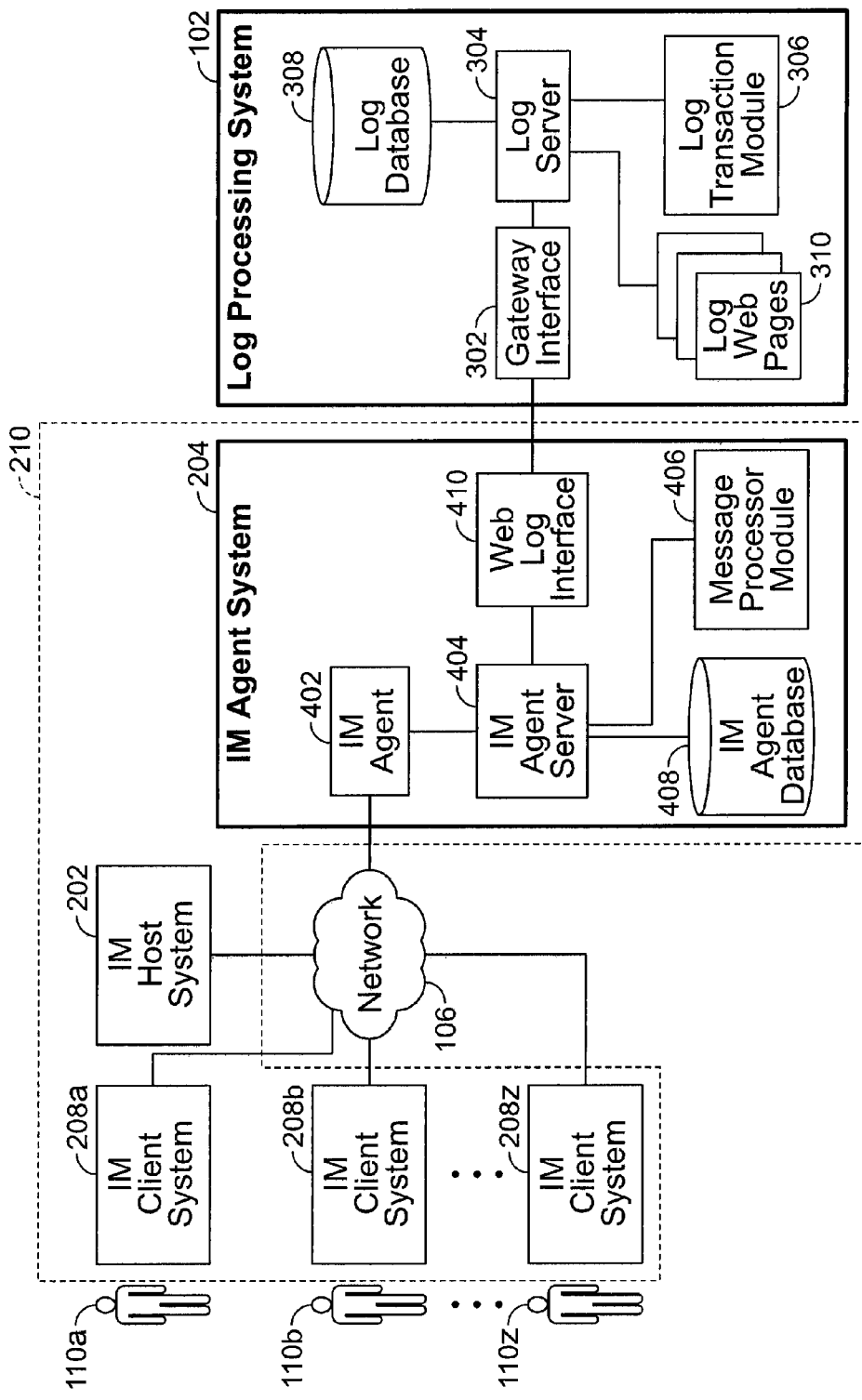

FIG. 4 is a block diagram illustrating one implementation of the interactive IM agent system 204 in greater detail. The IM agent system 204 includes an IM agent 402, an IM agent server 404, a message processor module 406, an IM agent database 408, and a web log interface 410. The IM agent 402, the message processor module 406, the IM agent database 408, and the web log interface 410 reside on the IM agent server 404. The IM agent server 404 may be a single server or multiple servers directly or indirectly connected to each other. In one implementation, the IM agent server 404 includes multiple distributed servers connected to each other through a communications network, such as the network 106. Alternatively, certain components depicted in FIG. 4, such as the IM agent database 408, may reside on other computer servers that do not form a part of the IM agent system 204.

The IM agent 402 is configured to handle incoming and outgoing messages between the IM agent system 204 and each of the users 110a-110z of the multiple IM client systems 208a-208z. The IMs handled by IM agent 402 are sent and received under the IM agent screen name used to identify the IM agent system 204 to the IM host system 202. IM agent 402 also directs received IMs to message processor module 406.

The message processor module 406 is configured to process IMs from each of the multiple users 110a-110z before sending requests to the log processing system 102 through the web log interface 410 that handles communications between the IM agent system 204 and the log processing system 102. For example, in one implementation, the message processor module 406 is configured to query the log processing system 102 (using the web log interface 410) to determine whether a particular user 110a has an associated web log. If it is determined that no web log is associated with the user 110a, the message processor module 406 generates a reply IM asking whether the user 110a wishes to create a web log. The reply then is sent to the user 110a by the IM agent 402. In a different implementation, most or all of the processing performed by the message processor module 406 as described above is performed by the log processing system 102. In such an implementation, the message processor module 406 merely reformats IMs received from the users 110 into a format understood by the log processing system 102 before sending the reformatted IMs to the log processing system 102.

The IM agent database 408 stores information needed by the IM agent system 204. Such information includes help messages and notifications that can be sent by the IM agent system 204 to the users 110a-110z. Generally, the IM agent database 408 is queried by the message processor module 406 to assist it in generating IMs to the users 110a-110z. For instance, in the event the log processing system 102 is unable to add the web log entry (e.g., because the log processing system 102 is not operational) to the associated web log of the particular user 110a, the IM agent system 204 notifies the user 110a that the entry could not be added to the user's web log using a template notification message stored in the IM agent database 408. The notification message may be personalized or customized by the message processor module 406 before it is sent to the user 110a by the IM agent 402. In other implementations, if the log processing system 102 is not operational or is busy, the IM agent system 204 stores received web log entries in the IM agent database 408 for later addition to appropriate web logs.

Although shown separately for ease of description, components of IM agent system 204 may be combined or further separated. For example, message processor module 406 and web log interface 410 may be combined into one module. Likewise, IM agent 402 and message processor module 406 may be combined into a single module or further separated into three or more modules.

One method of using the IM agent system 204 to add an entry to an existing web log is described in further detail with reference to FIG. 5A. For convenience, particular components described with respect to FIG. 2 are referenced when describing the process of FIG. 5A. Similar methodologies, however, may be applied in other implementations where different components are used to define the structure of the system, or where the functionality is distributed differently among the components shown by FIG. 2.

Figure 7:
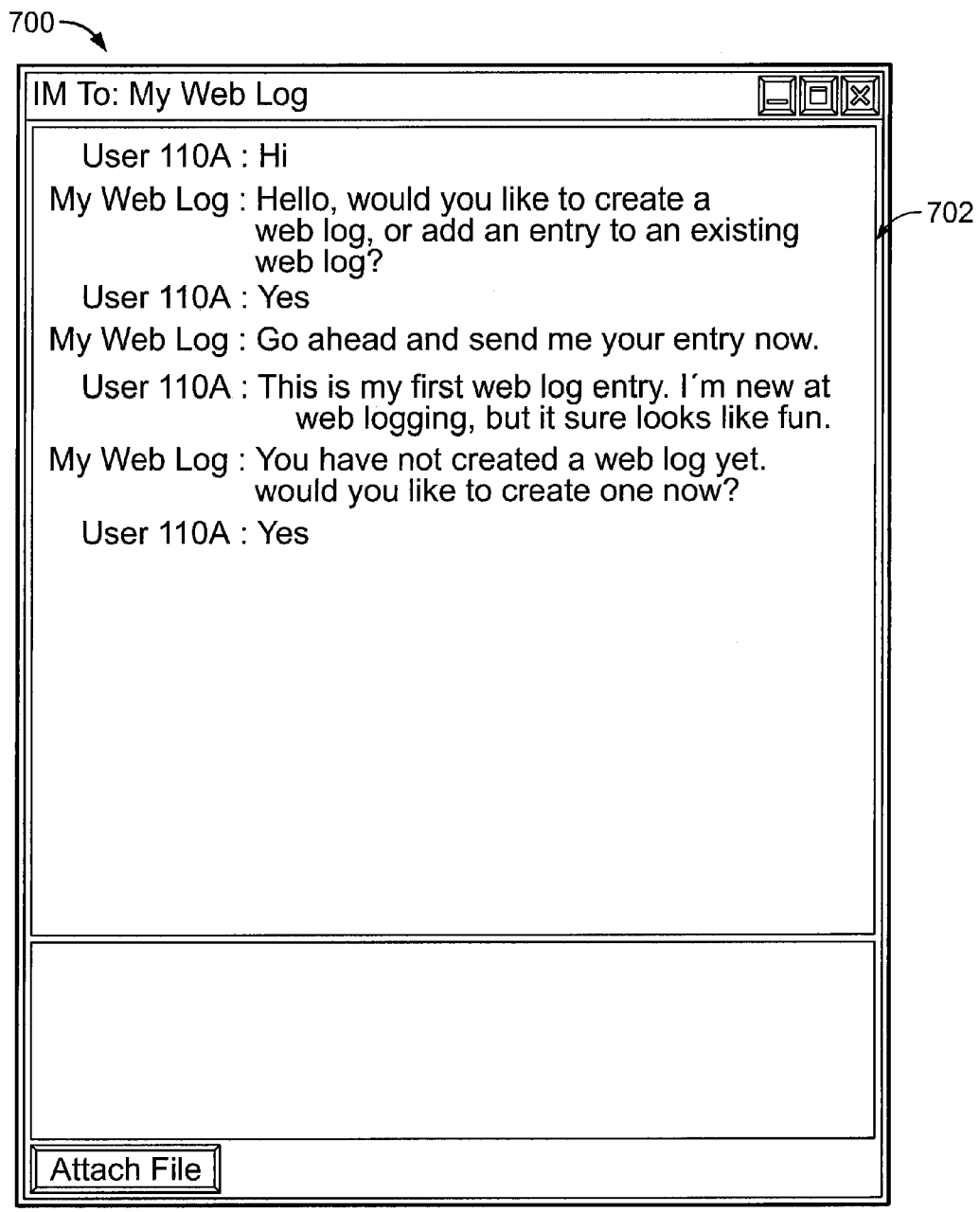
FIGS. 7, 8, 9, 10A, 10B and 11 are examples of user interfaces that may be displayed by the electronic logging system of FIGS. 1-4.

In the illustrated method, the IM agent system 204 receives one or more IMs from one or more users 110a-110z (504). FIG. 7 shows an exemplary user interface (UI) of an IM session window 700 with IM communications between the user 110a and the IM agent system 204. In FIG. 7, the IM agent system 204 is shown with a screen name of "MyWebLog Bot." For each IM received, the IM agent system 204 identifies the particular user 110a, that sent the IM based on the user's unique IM screen name (508). Because IM screen names uniquely identify each user of a given IM system 210, the IM agent system 204 in one implementation can identify additional information about the user 110a by querying an IM database (not shown) in the IM host system 202 with the screen name of the user 110a. By querying the IM database, the IM agent system 204 can identify the email address, the name, a user ID, and other user specific information about user 110a. Alternatively, the user 110a may be identified based on a user ID embedded in the received IM.

In some implementations, because the IM agent system 204 can identify which IM system 210 (e.g., AIM or MSN Messenger) is used by each user 110a-110z, the IM agent system 204 can distinguish between two distinct users 110a-110z having the same screen name on separate IM systems 210. The identification of which IM system 210 is used is made on the basis of an identifier and/or an IM host system address accompanying the initial IM, on the basis of a distinct protocol used by the IM system 210, and/or by other techniques.

Additionally, the IM agent system 204 determines the type of communications device (e.g., personal computer, PDA, or web-enabled mobile phone) used to send the IM to the IM agent system 204. Using this information, the IM agent system 204 generates different help and reply IMs, customizing them for content and format, based on the capabilities of the particular communications device employed by user 110a. For example, communications devices capable of displaying rich text may receive IM messages with formatted text and embedded links. Constrained devices, such as web-enabled cell-phones, may receive plain text only. In such implementations, the IM agent system 204 takes into account the type of communications device being used by the user 110a when generating IMs to the user 110a. The IM agent system 204 can also customize the content of reply messages based on user information obtained through querying the IM database.

After determining the identity of the user that sent the IM (508), the IM agent system 204 determines whether the user 110a identified a valid, existing web log in the IM (510). This determination can be made by sending a query to the log processing system 102 with identifying information provided in the received IM. The identifying information, for example, can be a web log title, a web log short name, or a web log ID. If the user 110a did not identify a valid web log, the IM agent system 204 determines whether the user 110a has an existing web log (512). This determination may be made by querying the log processing system 102 with the IM screen name of the user 110a. Alternatively, the query may be made with the user ID, user email address, or other user information obtained from the IM database (as discussed above). Where there is a dedicated device ID, such as a static Internet Protocol (IP) address, associated with the user, that dedicated ID also can be used to make the query. The query returns an indicator showing whether the user 110a has an existing web log. In some implementations, the query also returns a list of all existing web logs associated with the user 110a.

If the user 110a does not have an existing web log, the IM agent system 204 sends an IM to the user 110a asking if the user wants to create a web log (514). FIG. 7 shows an exemplary UI asking whether the user 110a wants to create a web log. The IM agent system 204 next determines whether the user 110a responded with an instruction to create a web log (516). If the user 110a responds by stating that he does not wish to create a web log, the IM agent system 204 does not create a web log for user 110a. If, however, the user 110a responds by requesting the creation of a web log, a new web log is created for the user 110a (518) according to the create process shown in FIG. 6. In other implementations, the IM agent system 204 automatically creates and associates a web log with the user 110a without asking whether the user 110a wishes to create a web log.

After a web log is created (518), or if the user 110a identified a valid web log (510), the log processing system 102 adds the contents of the IM to the web log as a new web log entry (520). The web log entry may be time stamped with the current date and time before it is added to the web log. In other implementations (not shown), the IM agent system 204 assumes that the identified web log identified in the IM is valid and does not query the log processing system 102 to determine whether the identified web log is valid. If an error code then is returned indicating that the identified web log is not a valid, existing web log, the IM agent system 204 may notify the user 110a that the identified web log is not valid, and may prompt the user 110a to create a new web log.

In some implementations, the contents of the IM are parsed to determine whether the IM contains commands or text signals recognized by the IM agent system 204. The commands recognized by the IM agent system 204 include, for example, help, cancel, edit, new, create, append, delete, and quit. Thus, if the user 110a types "help," the IM agent system 204 responds with an appropriate help message. Other such commands or text signals can be used to tag certain portions of the IM contents for entry into various fields of a web log template. Those fields include, for example, a subject field, a mood field, a location field, a picture field, a web log identifier field (used to identify the log as discussed above), and a music or audio field (see FIG. 11). Using such commands and text signals, the user 110a may attach pictures, video, and/or audio files to the IM for inclusion in the web log. Alternatively, the IM agent system 204 opens a pop-up window when it receives a picture, audio, video, or graphics command from the user 110a. The pop-up, which may be a third-party tool, is configured to permit the user 110a to easily submit pictures, audio, video, and graphics. Optionally, the contents of the IM are spell-checked and filtered for inappropriate language before being added to the web log as a new web log entry. After time stamping and any further processing, the web log entry is formatted in a standard default or user-customized web log format and added to the web log of the user 110a Next, the IM agent system 204 runs an intermediate process (522), which is described below with reference to FIG. 5B.

If it is determined that the user 110a has an existing web log (512), the IM agent system 204 next determines whether the user 110a has more than one existing web log (526). This determination can be made from information returned by the query run to identify the user (508), or a second query can be run to identify all web logs associated with the screen name, email address, and/or user ID of user 110a. If the user 110a has only one web log, the IM agent system 204 proceeds by adding the contents of the IM to the web log of the user 110a as discussed above (520 and 522).

If the user 110a has multiple web logs, the IM agent system 204 sends an IM to the user 110a asking the user to identify one of the web logs to receive the new web log entry (528). In one implementation, the IM sent by the IM agent system 204 identifies all of the web logs of the user 110a in an enumerated list. FIG. 10B shows an exemplary UI listing multiple web logs of the user 110a in an enumerated list. The user 110a may select the desired web log by entering a number or letter associated with one of the listed logs (see FIG. 10B), or by entering other identifying information, such as the web log title or short name.

The IM agent system 204 then determines whether the user 110a has identified a web log to receive the new web log entry (530). If the user 110a did so identify a web log, the new web log entry is added to the identified web log (520 and 522). If the user 110a has not identified a web log within a set time, the IM agent system 204 sends another IM notifying the user 110a that the web log update will be cancelled unless the user responds within a specified time (532). At this point, the IM agent system 204 also may send a help message to the user 110a.

Next, the IM agent system 204 determines whether the user 110a responded to the last IM notifying user 110a of the impending cancellation of the web log entry (534). If the user 110a responds and selects a web log within a set time, the contents of the IM are added to the selected web log as a new web log entry. Otherwise, the web log update is cancelled and no entry is added to the web logs of the user 110a. In other implementations, the IM agent system 204 either adds the contents of the IM to a default web log or waits until the user 110a responds or closes the IM session window. As understood by one of ordinary skill, the order of certain events described above can be rearranged without altering the overall nature of the process. For example, although the described process determines the type of communications device employed by the user 110a 508, such a determination could be made at other points in the process, such as at 514 or 528. The order of certain steps, such as 510, 512, and/or 526, can be altered, and some steps, such as 5220, can be deleted entirely, without changing the nature of the process shown in FIG. 5A. It also should be noted that multiple instances of the process of FIG. 5A can run in parallel. Additionally, for simplicity in description, many of the process steps discussed above are described as implemented on the IM agent system 204. Many of those steps, such as 510, 512, and/or 526, alternatively can be implemented in the log processing system 102.

Figure 5B:
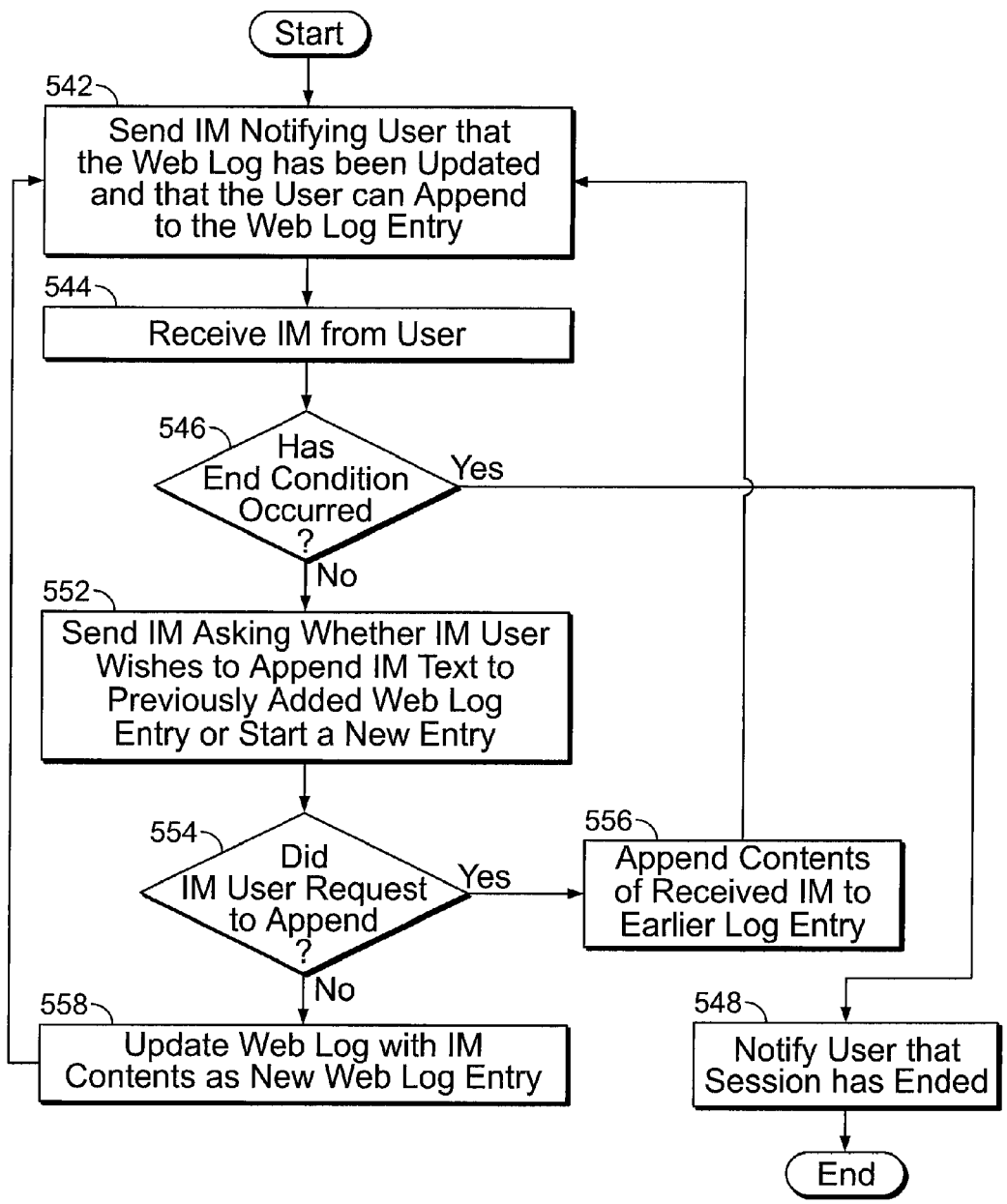

Referring to FIG. 5B, the agent system 204 optionally permits the user 110a to add another entry or append to an earlier web log entry. The agent system 204 notifies the user 110a that the contents of the IM were added to the web log (542). The notification further informs the user 110a that another entry can be added or that additional material may be appended to the entry just previously added to the web log (542). The agent system 204 then receives another IM from the user 110a (544). The agent system 204 determines whether an end condition has occurred (546). An end condition occurs, for instance, when the user 110a closes the IM session window 700 (see FIG. 7), when the user 110a gives a quit command, or after the expiration of a specified time. If an end condition has occurred, the agent system 204 notifies the user 110a that the previous session has ended and that the user 110a must begin a new IM session (548). In some implementations, the agent system 204 also may notify the user 110a that the earlier entry can be edited using the "edit" command (see description of additional features below).

If no end condition has occurred, the agent system 204 sends an IM asking whether the user 110a wishes to append to the earlier entry or start a new entry (552). The agent system 204 then determines whether the user 110a requested that the contents of the IM be appended to the earlier web log entry (554). If the user 110a requested that the contents be appended, the agent system 204 appends the contents to the earlier web log entry (556). Otherwise, the agent system 204 adds the contents of the IM to the web log as a new web log entry (558). After either appending the contents to the earlier entry (556) or adding the contents to the web log as a new entry (558), the agent system 204 repeats the FIG. 6 process by notifying the user 110a that the contents of the IM were appended or added to the web log (542).

Figure 6:
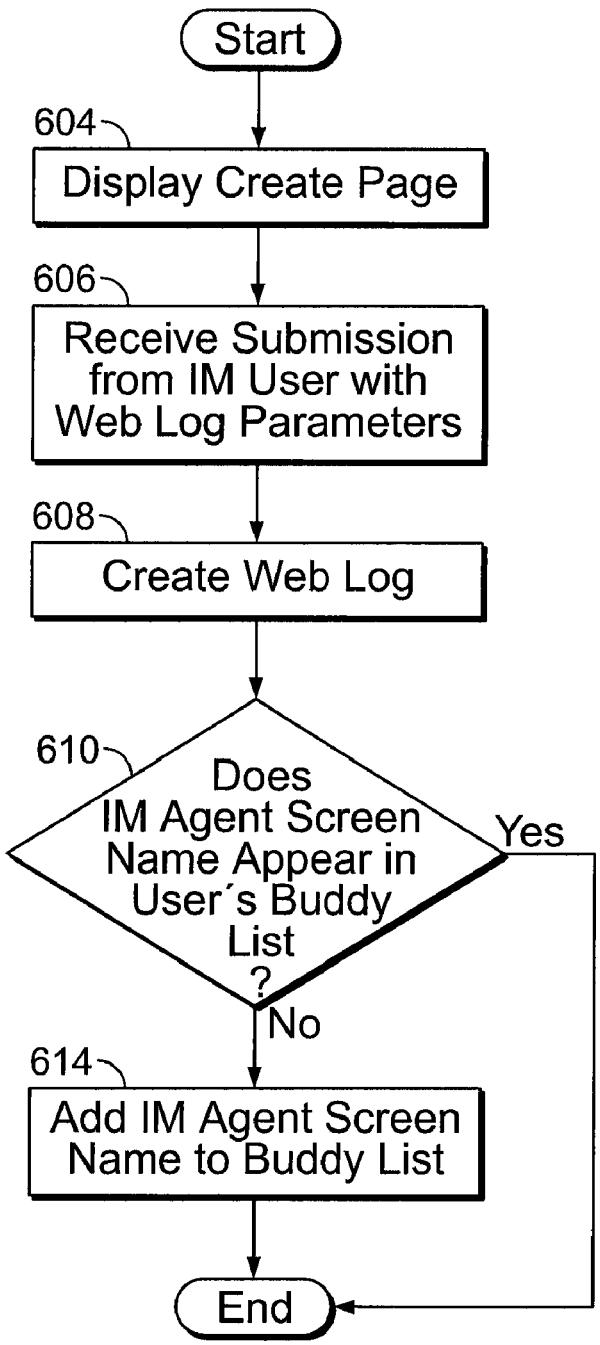
FIG. 6 is a flow chart illustrating a method of creating an electronic log.

FIG. 6 illustrates a process of using the IM agent system 204 to create a web log. In the illustrated process, the agent system 204 displays a create page 800 (see FIG. 8) that allows the user to specify various parameters of the web log (604). Those parameters may include, for example, a web log title, a short name for the web log, and a brief description of the web log for first time visitors. In other implementations, the user 110a is prompted for such parameters through the IM session window without display of a separate window or pop-up box. The user 110a also may create the web log through a webpage. After receiving a submission from the user 110a specifying the web log parameters (606), the agent system 204 creates the web log by sending the properly formatted information for the new web log to the log processing system 102 (608).

The newly created web log is associated with the screen name of the user 110a through indexing in the log database 308. The log processing system 102 additionally may assign a web log ID to the newly created web log. The agent system 204 next determines whether the IM screen name of the agent system 204 already appears in the IM buddy list of the user 110a (610). If the screen name of the agent system 204 does not already appear in the buddy list of the user 110a, it is added to the buddy list of the user 110a (614). The screen name of the agent system 204 may be added to a new buddy group, such as "agents" or "web logs." In one implementation, the agent system 204 notifies the user 110a that the screen name of the agent system 204 has been added to the buddy list for the user 110a, and further informs the user 110a that he or she can add entries to the newly created web log by sending an IM to the screen name of the agent system 204. Additionally, if requested by the user 110a, the agent system 204 sends emails announcing the creation of the web log for the user 110a to a list of email addresses specified by the user 110a. If the IM screen name of the agent system 204 already appears in the buddy list of the user 110a (614), the process ends.

In other implementation, the agent system 204 may generate a new "log specific" screen name based on the web log title, the short name of the log, or other such log specific information. The new screen name thus can be a facade for the IM agent system 204 in that IMs sent to either the IM screen name of the agent system 204 or the new "log specific" screen name are received by the same IM agent system 204. In this implementation, the new "log specific" screen name may include a web log identifier, such as the short name, in each IM sent to the agent system 204. For example, the new "log specific" screen name can be the short name of the web log, which can be automatically generated by the agent system 204 or selected by the user 110a during creation. As long as the user 110a creates distinct short names for web logs associated with the user 110a, the IM agent system 204 can identify the targeted web log on the basis of the screen name of the user 110a and the facade "log specific" screen name.

Figure 8:
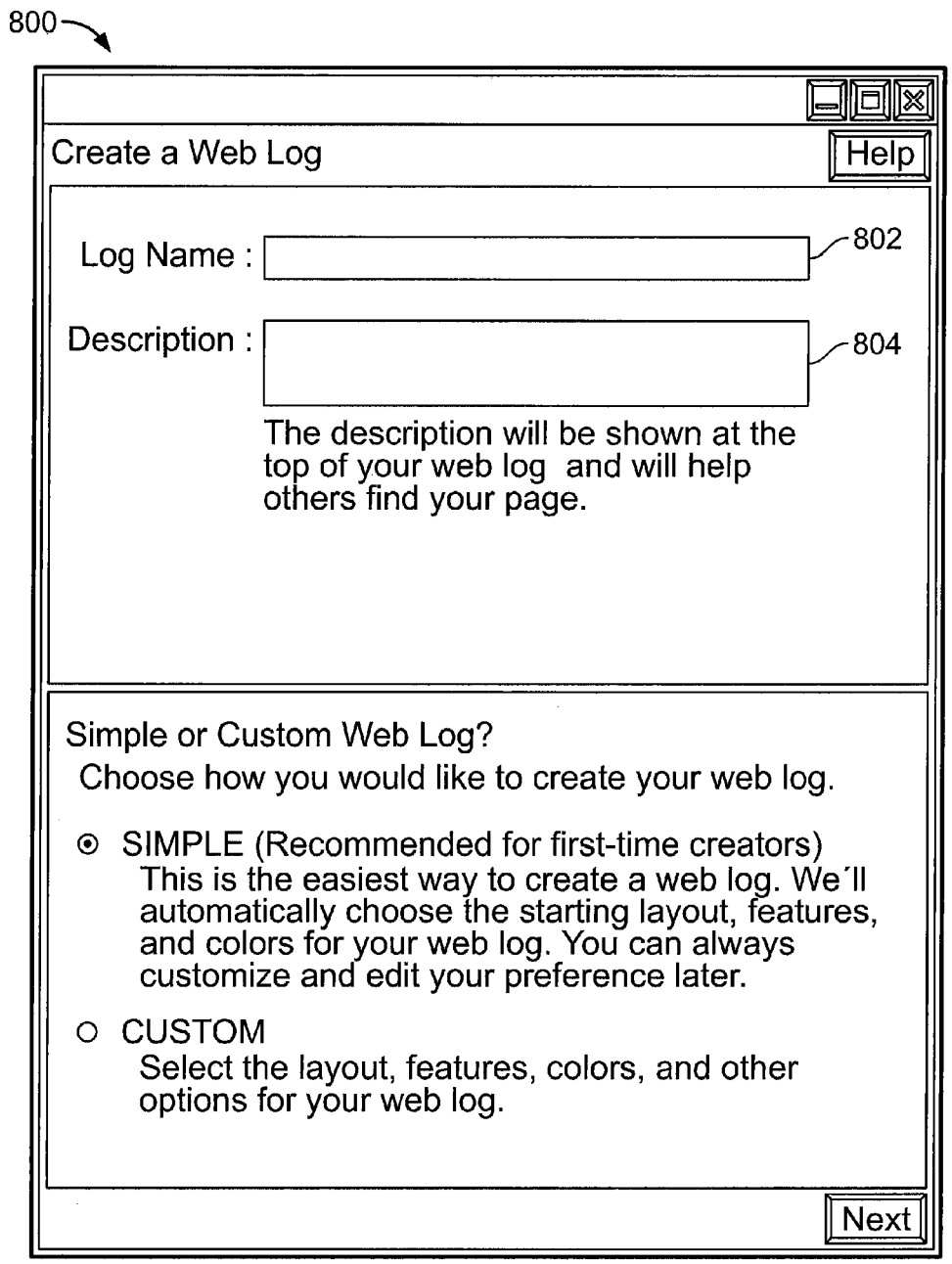

FIGS. 7-10 illustrate sample user interfaces for various components of the electronic logging system 200. Referring to FIG. 7, an IM session window 700 is displayed with sample correspondence between the user 110a and the IM agent system 204 listed in dialog box 702. As depicted, if the user 110a sends a web log entry before creating a web log, the IM agent system 204 can inquire as to whether the user 110a would like to create a web log. As previously discussed with reference to FIG. 5A and FIG. 6, if the user 110a indicates a desire to create a web log, the IM agent system 204 opens a creation window to help the user 110a create a web log. FIG. 8 illustrates a sample creation window 800. As shown in FIG. 8, the user 110a can input a title and description for the web log using text fields 802 and 804. The description is displayed on the web log to give first time viewers a quick idea about the nature of the web log.

Additionally, a text field can be provided for the user 110a to enter a short name for the web log. The short name can be used in identifying the web log to the IM agent system 204 during later IM sessions (see discussion of step 510 of FIG. 5A). The short name also can be used to create permalinks to the web log entries, or to create "log specific" screen names for the IM agent system 204. Such "log specific" screen names can be added to buddy list 900 of the user 110a (see FIG. 9). For example, if the user 110a has two web logs called "Tricia's Travels in Tahiti" and "Tricia's Cooking Corner," the user 110a may specify the creation of "log specific" screen names in buddy list 900. In some implementations, although specified as a distinct "log specific" screen name, IMs to each of the "log specific" screen names are received by the IM agent system 204. The user 110a can opt to customize the web log or to use a standard default template.

If the user 110a opts to customize the web log, the user specifies various layout features, such as how many columns to display in the web page, whether to allow viewers to add comments to the web log, whether to display an "about me" section introducing the web log owner, and the number of entries to display on the web page. The user 110a can select a check box (not shown) to have the IM agent system 204 generate an email announcing the creation of the new web log.

In another implementation (not shown), the creation windows allow the user 110a to identify other IM users 110a-110z as contributing editors on the web log. Contributing editors can add entries to the web log, edit or delete existing entries, and respond to viewer comments. Contributing editors generally are identified by their IM screen names. In some implementations, the IM agent system 204 notifies the contributing editors, by email or an IM, of their editorial powers for the web log. Using a related feature, if the user 110a has two different screen names (e.g., one at work and one for personal use), the user 110a can register both screen names with the IM agent system 204, thereby associating the web log with both screen names for the user 110a. By associating both screen names with the web log, the user 110a can add updates to the web log from either screen name (i.e., from work or from home). The title, description, and other web log parameters alternately can be submitted to the IM agent system 204 through the IM session window 700.

FIG. 9 shows the "MyWebLogBot" screen name 802 of the IM agent system 204 added to the buddy list 900 of the user 110a that created the web log (see discussion concerning step 614 of FIG. 6), and, optionally, to the buddy lists of all contributing editors. The creator and contributing editors can remove the screen name 802 from their buddy lists using the normal setup/delete procedures of the IM system 210. Because the screen name 802 of the IM agent system 204 is not specific to each user, the same screen name 802 can be used by any of IM users 110a-110z to create a web log and/or add entries to their existing web logs. Similarly, a single user 110a can use the same screen name 802 to add entries to multiple web logs as described in reference to FIG. 5A and shown in FIG. 10B.

Figure 10A:
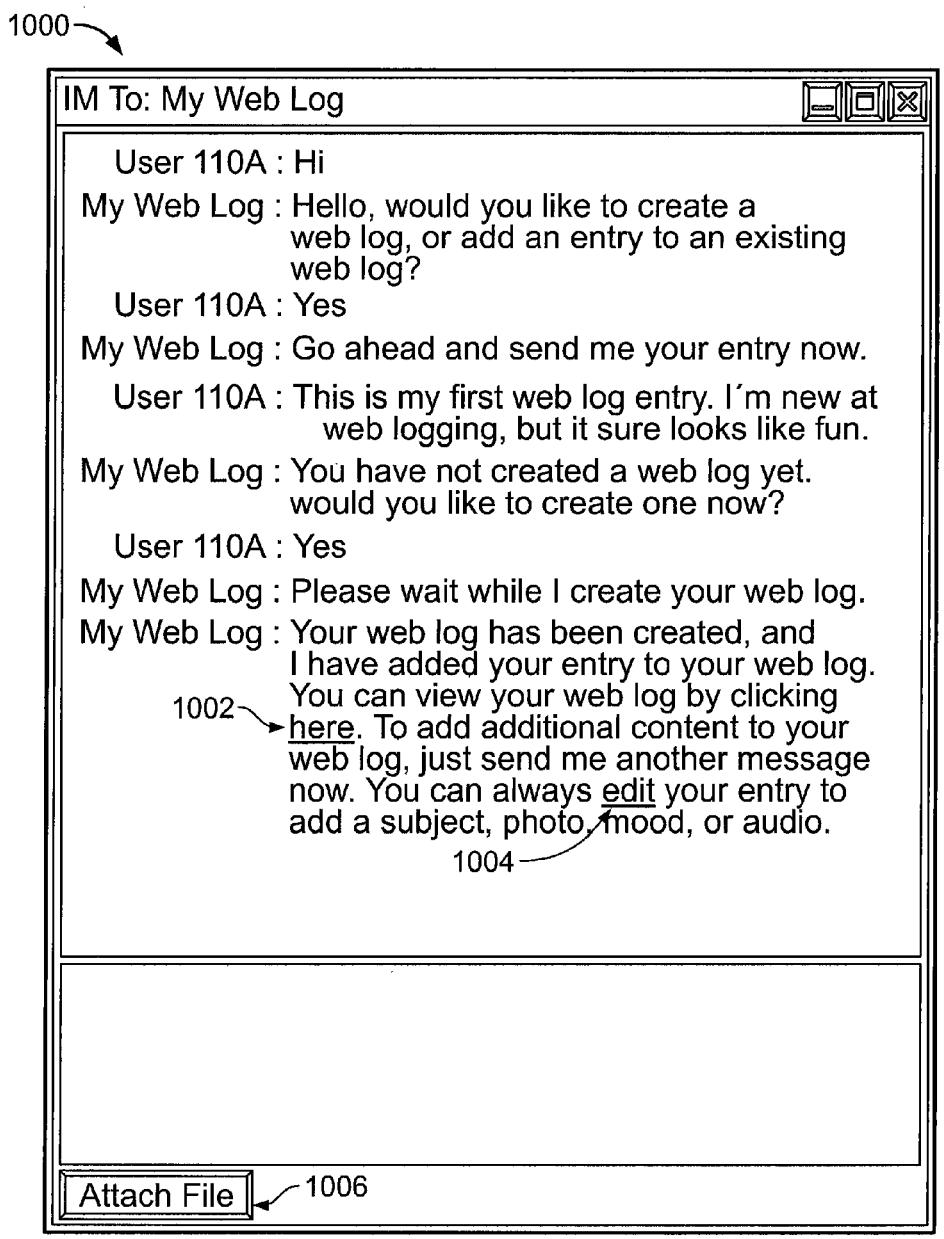
Figure 10B:
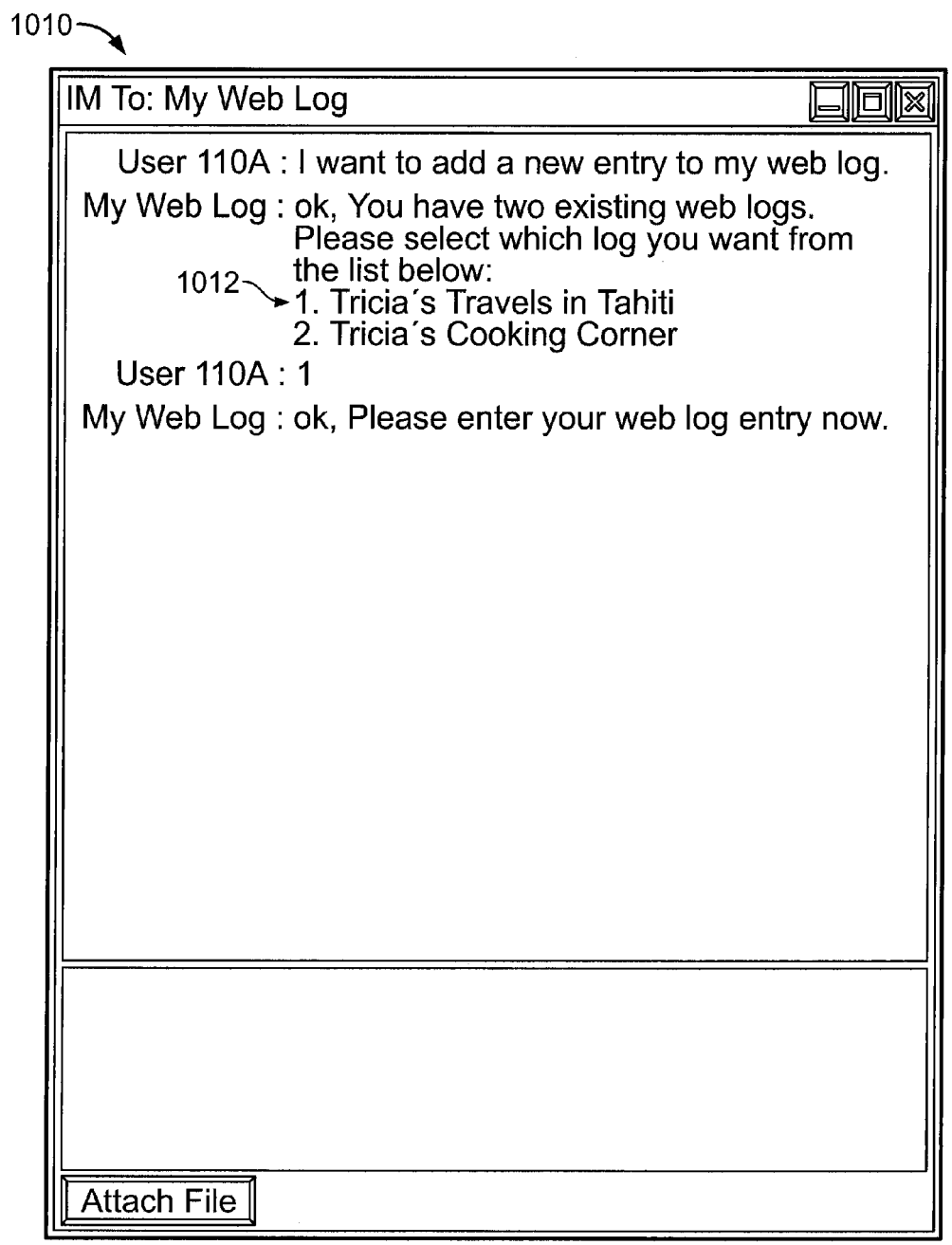

FIG. 10A shows an IM session window 1000 that is a continuation of the sample correspondence of FIG. 7 between the user 110a and the IM agent system 204. As depicted, after adding the contents of the earlier IM to the web log, the IM agent 204 informs the user 110a that the web log entry was added successfully. The IM agent system 204 provides an embedded link 1002 to the newly created web log, and further informs the user 110a that the web log entry can be edited to add pictures, audio, and additional text. In the illustrated implementation, the user 110a can select link 1004 to add additional content to the web log entry. The user 110a may attach pictures or audio files using button 1006, and may append text to the earlier message by typing a new message to the IM agent system 204.

With reference to FIG. 10B, an IM session window 1010 is shown with sample correspondence between the user 110a and the IM agent system 204. This figure corresponds to the discussion of item 528 of FIG. 5A, and shows a response from the IM agent system 204 identifying all web logs associated with the user 110a in an enumerated list 1012. The user 110a may select the desired web log by entering a number corresponding to one of the listed logs or by entering other identifying information, such as "Tahiti."

FIG. 11 shows a sample web log 1100 viewable by persons with Internet access. The web log 1100, which is displayed in a web page, shows the most recent web log entry 1102 at the top of the web log 1100. As illustrated, the entry 1102 may include pictures and audio. Multiple pictures can be displayed in a photo album. Audio files can be music or other audio files. The user 110a can identify a mood (e.g., happy or relaxed) using text and/or a graphical mood icon. The web log title 1104 and description 1106 also are displayed on the displayed web log. Additional information about the web log owner optionally is displayed in a side text box 1108. Links to recent entries 1110 and links to older entries 1112 are accessible from the main web log page 1100. If the user 110a has chosen to allow viewers to add comments to the web log, viewers may click a link 1120 on the web page to add a viewer comment. Viewer comments are displayed in a viewer comment field 1116. Other optional features include a guestbook 1114 that viewers can sign and in which viewers can record comments for the user 110a, and a reporting box 1118 identifying how many page hits have been recorded for the web log 1100.

An owner's version (not shown) of the web log 1100 is viewable by the creating user (the owner) and all contributing editors. The owner's version looks similar to the publicly displayed web page except for the addition of some control buttons that allow the user 110a to edit entries, add pictures or audio, change web log layout, delete individual viewer comments, and block a particular viewer from adding future comments. Additional reporting parameters, such as the date the web log was last accessed, are displayed on the owner's version.

Figure 12:
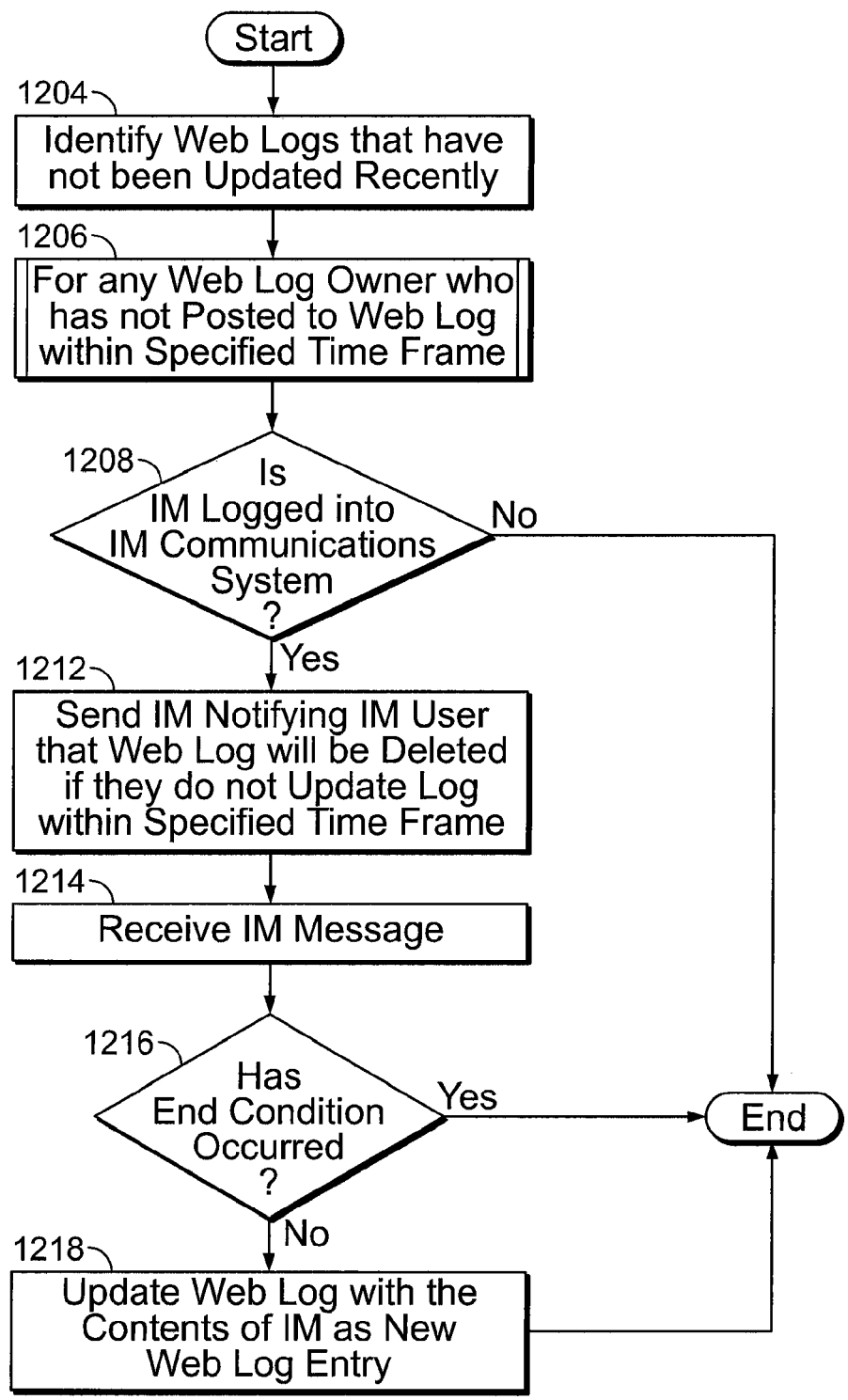
FIG. 12 is a flow chart illustrating a method of notifying IM users that an electronic log is outdated.

FIG. 12 illustrates a notification process whereby the agent system 204 notifies owners (e.g., user 100a) of outdated web logs. Initially, stale or outdated web logs are identified (1204). The identification is performed by querying the log processing system 102 for all web logs where the date the log was last updated was prior to a specified date. For instance, the log processing system 102 may look for all logs that have not been updated in the past four weeks. The log processing system 102 returns the query results to the agent system 204. For each outdated web log, the IM agent system 204 determines whether the owner currently is logged into the IM system 210 (1208).

If the owner currently is logged into the IM system 210, the IM agent system 204 sends the owner an IM notifying the owner that the outdated web log will be deleted by a specified date unless it is updated prior to the specified date (1212). The IM further invites the owner to send an IM for entry into the web log. After receiving an IM for entry into the web log (1214), the IM agent system 204 determines whether an end condition has occurred (1216). If no end condition has occurred, the contents of the IM are added to the web log as a new web log entry (1218). The discussion of end conditions and alternative handling of end condition events described with respect to FIG. 5B applies equally to the process of FIG. 12.

After adding the new web log entry (1218), or if the IM agent system 204 previously determined that the owner was not currently logged into the IM system 210 (1208), the process ends. In one implementation, the IM agent system 204 generates and sends an email to the owner before ending. The email notifies the owner that the outdated web log will be deleted by a specified date unless updated prior to that date.

In one implementation, before ending, the IM agent system 204 records the notification event in an event log along with the date the owner was notified of the outdated web log. A later delete process (not shown) checks for outdated web logs and, for each outdated web log found, cross-references the event log to determine whether the owner was notified of the outdated web log. If the owner was notified and the specified time period has elapsed, the delete process removes the web log. The delete process then notifies the owner that the web log was deleted. If, after checking the event log, the delete process determines that the owner has not been notified of the outdated web log, the delete process sends an alert to the notification process requesting that the owner be notified of the outdated log.

A number of additional features of the IM agent system 204 are described below. In one implementation, the user 110a deletes web log entries by sending an IM to the IM agent system 204. To delete a specific entry, the user 110a sends a delete command identifying the web log (if the user 110a has more than one web log) and the entry to be deleted. For example, a sample delete command may look like the following:

User 110a: delete (entry title) from (web log title)
MyWebLog: Ok, please wait while I delete (entry title) from (web log title).

If the user 110a did not title the entry, the user 110a can identify the entry by date. If there are multiple web log entries with the same entry date, the IM agent system 204 responds by sending the user 110a an enumerated list with a portion (such as the beginning) of each entry quoted. For example, a sample session illustrating this procedure may look like the following:

User 110a: delete 7/11/03 entry from (web log title)
MyWebLog: You have two entries from July 11, 2003. Please select which of the entries you would like to delete from the list below:
1. "Today was the best beach day yet! I went sailing . . . "
2. "I just got back from scuba diving a reef off the coast . . . "
3. Delete both entries
User 110a: 3
MyWebLog: Ok, please wait while I delete all July 11, 2003 entries from (web log title).

The user 110a also can edit entries previously added to a web log by sending an IM to the IM agent system 204. To edit a specific entry, the user 110a sends an edit command identifying the web log (if the user 110a has more than one web log) and the entry to be edited (by title or date). After the user 110a identifies the entry to be edited, the IM agent system 204 fetches the entry and provides the entry to the user 110a to edit, either through a portion of the IM session window or another pop-up box. Alternatively, the IM agent system 204 can open and display the entry in another editing tool, such as a third party word processing tool.

Another feature of the IM agent system 204 allows the user 110a to request that the IM agent system 204 proactively contact the user 110a for reminders and/or reporting. For example, the user 110a can request that the IM agent system 204 remind the user 110a to add entries to their web logs. Such reminders can be scheduled for a specified time, such as a set day of each week, or can be a standard system reminder, such as a standard reminder that the user 110a has not yet posted an entry to a newly created web log. Additionally, the IM agent system 204 can proactively contact the user 110s to provide reporting information requested by the user 110a at creation. The reporting information can include, for example, the number of web log accesses since creation, the number of web log accesses in the past week, or the number of comments received on each entry. When the user 110a is identified and currently able to receive IMs, the reminders and reporting information is sent in an IM to the user 110a. Otherwise, the information may be emailed to the user 110a. In other implementations, the agent system 204 detects when an IM session window addressed to the screen name of the agent is opened by the user 110a. After the elapses of a set time, the IM agent system 204 proactively sends a help message to the user 110a explaining how to use the IM agent system 204.

The IM agent system 204 also is configured to temporarily store updates to web logs in its database 408 in the event that the log processing system 102 is busy or out-of-service. This ensures that the user 110a still can add entries to the web log without having to resend the entry to the agent system 204 at a later time. In this situation, the agent system 204 notifies the user 110a that the update could not be completed. The agent system 204 further informs the user 110a that the update will be stored by the agent system 204 until the entry can be added to the web log.

It will be understood that various modifications may be made. For example, advantageous results still could be achieved if steps of the disclosed processes are performed in a different order and/or if components in the disclosed systems are combined in a different manner and/or replaced or supplemented by other components. Accordingly, other implementations are within the scope of the following claims.

What is claimed is:

1. A computer-implemented method comprising:

storing, using an electronic data storage system, information recording relationships between each of multiple web sites and corresponding instant messaging addresses, each web site corresponding to at least one instant messaging address;

receiving an instant message;

receiving an indication of an instant messaging source address from which the received instant message was sent;

determining that the received instant message includes:
a command, in the instant message, to add content; and
content to be added to a web site, the content including at least textual content in the received instant message;

comparing the indication of the instant messaging source address from which the received instant message was sent to the stored information;

based on results of comparing the indication of the instant messaging source address from which the received instant message was sent to the stored information, identifying, from among the multiple web sites, a particular web site that the stored information indicates corresponds to the instant messaging source address from which the received instant message was sent; and as a consequence of both determining that the received instant message includes a command to add content and content to be added to a web site and identifying the particular web site that the stored information indicates corresponds to the instant messaging source address from which the received instant message was sent, adding the content to be added to the particular web site.

2. The method of claim 1 wherein adding the content to be added to the particular web site includes:

reformatting the content to be added to the particular web site before adding the content to the particular web site; and adding the reformatted content to the particular web site.

3. The method of claim 2 wherein reformatting the content to be added to the particular web site includes time stamping the content to be added to the particular web site.

4. The method of claim 1 wherein:

receiving an indication of an instant messaging source address from which the received instant message was sent includes receiving an instant messaging identifier corresponding to an instant messaging account from which the received instant message was sent;

comparing the indication of the instant messaging source address from which the received instant message was sent to the stored information includes comparing the instant messaging identifier to the stored information; and identifying, from among the multiple web sites, a particular web site that the stored information indicates corresponds to the instant messaging source address from which the received instant message was sent includes identifying, from among the multiple web sites, a particular web site that the stored information indicates corresponds to the instant messaging identifier.

5. The method of claim 1 wherein identifying, from among the multiple web sites, a particular web site that the stored information indicates corresponds to the instant messaging source address from which the received instant message was sent includes:

identifying, from among the multiple web sites, two or more web sites that the stored information indicates corresponds to the instant messaging source address from which the received instant message was sent;

sending a reply instant message to the instant messaging source address from which the received instant message was sent soliciting selection of one of the two or more web sites as a web site to which the content is to be added; and receiving another instant message that is responsive to the reply instant message and that selects the particular web site as the web site to which the content is to be added.

6. The method of claim 1 further comprising, after adding the content to the particular web site, sending a reply instant message to the instant messaging source address from which the received instant message was sent confirming that the content was added to the particular web site.

7. The method of claim 1 further comprising:

receiving, from the instant messaging source address, a new instant message that includes an indication that the new instant message includes additional content that is to be appended to the content that was added to the particular web site;

receiving an indication that the new instant message was sent from the instant messaging source address;

determining that the received instant message includes additional content to be appended to the content that was added to the particular web site;

comparing the indication that the new instant message was sent from the instant messaging source address to the stored information;

based on results of comparing the indication that the new instant message was sent from the instant messaging source address to the stored information, identifying, from among the multiple web sites, the particular web site as corresponding to the instant messaging source address; and as a consequence of both determining that the received instant message includes content to be appended to the content that was added to the particular web site and identifying the particular web site as corresponding to the instant messaging source address, updating the particular web site by appending the additional content to the content that was added to the particular web site.

8. The method of claim 1 further comprising:

detecting a spelling error in the textual content before adding the textual content to the particular web site;

correcting the spelling error in the textual content before adding the textual content to the particular web site;

wherein adding the content to the particular web site includes adding the textual content with the corrected spelling error to the particular web site.

9. The method of claim 1 wherein the content to be added to the particular web site includes a picture such that:

receiving an instant message includes receiving an instant message that includes the picture; and adding the content to be added to the particular web site includes adding the picture to the particular web site.

10. The method of claim 1 wherein the content to be added to the particular web site includes audio content such that:

receiving an instant message includes receiving an instant message that includes the audio content; and adding the content to be added to the particular web site include adding the audio content to the particular web site.

11. The method of claim 1 wherein the content to be added to the particular web site includes video content such that:

receiving an instant message includes receiving an instant message that includes the video content; and adding the content to be added to the particular web site includes adding the video content to the particular web site.

12. The method of claim 1 further comprising:

receiving, from the instant messaging source address, a new instant message that includes a command to delete material from the particular web site;

receiving an indication that the new instant message was sent from the instant message source address;

determining that the received instant message includes an instruction a command to delete material;

comparing the indication that the new instant message was sent from the instant messaging source address to the stored information;

based on results of comparing the indication that the new instant message was sent from the instant messaging source address to the stored information, identifying, from among the multiple web sites, the particular web site as corresponding to the instant messaging source address; and as a consequence of both determining that the received instant message includes a command to delete material and identifying the particular web site as corresponding to the instant messaging source address, deleting the material from the particular web site.

13. The method of claim 1 wherein receiving an instant message includes receiving an instant message addressed to an on-line identifier that corresponds to a software application for automatically receiving and responding to instant messages.

14. The method of claim 1 further comprising:

receiving a new instant message;

receiving an indication of another instant messaging source address from which the new instant message was sent, the other instant messaging source address being different from the instant messaging source address;

determining that the new instant message includes new content to be added to a web site;

comparing the indication of the other instant messaging source address from which the new instant message was sent to the stored information;

based on results of comparing the indication of the other instant messaging source address from which the new instant message was sent to the stored information, identifying, from among the multiple web sites, another web site that the stored information indicates corresponds to the other instant messaging source address from which the new instant message was sent; and as a consequence of both determining that the new instant message includes new content to be added to a web site and identifying the other web site that the stored information indicates corresponds to the other instant messaging source address from which the new instant message was sent, adding the new content to be added to the other web site.

15. A non-transitory computer-readable storage medium storing instructions that, when executed, cause a at least one processor to:

store, using an electronic data storage system, information recording relationships between each of multiple web sites and corresponding instant messaging addresses, each web site corresponding to at least one instant messaging address;

receive an instant message;

receive an indication of an instant messaging source address from which the received instant message was sent;

determine that the received instant message includes:

a command, in the received instant message, to add content; and content to be added to a web site, the content including at least textual content in the received instant message;

compare the indication of the instant messaging source address from which the received instant message was sent to the stored information;

based on results of comparing the indication of the instant messaging source address from which the received instant message was sent to the stored information, identify, from among the multiple web sites, a particular web site that the stored information indicates corresponds to the instant messaging source from which the received instant message was sent; and as a consequence of determining that the received instant message includes a command to add content and content to be added to a web site and identifying the particular web site that the stored information indicates corresponds to the instant messaging source address from which the received instant message was sent, add the content to be added to the particular web site.

16. A computer-implemented method comprising:

storing, using an electronic data storage system, information recording relationships between each of multiple web sites and corresponding electronic messaging addresses, each web site corresponding to at least one electronic messaging address;

receiving an electronic message;

receiving an indication of an electronic messaging source address from which the received electronic message was sent;

determining that the received electronic message includes:

a command, in the received electronic message, to add content; and content to be added to a web site, the content including at least textual content in the received instant message;

comparing the indication of the electronic messaging source address from which the received electronic message was sent to the stored information;

based on results of comparing the indication of the electronic messaging source address from which the received electronic message was sent to the stored information, identifying, from among the multiple web sites, a particular web site that the stored information indicates corresponds to the electronic messaging source address from which the received electronic message was sent; and as a consequence of both determining that the received electronic message includes content to be added to a web site and identifying the particular web site that the stored information indicates corresponds to the electronic messaging source address from which the received electronic message was sent, adding the content to be added to the particular web site.

17. The method of independent claim 16 wherein receiving an electronic message includes receiving an electronic message sent from a mobile telephone.

18. The method of independent claim 16 wherein receiving an electronic message sent from a mobile telephone includes receiving an instant message sent from a mobile telephone.

19. The method of independent claim 16 further comprising:
- receiving a new electronic message;
- receiving an indication of another electronic messaging source address from which the new electronic message was sent;
- determining that the new electronic message includes new content to be added to a web site;
- comparing the indication of the other electronic messaging source address from which the new electronic message was sent to the stored information;
- based on results of comparing the indication of the other electronic messaging source address from which the received electronic message was sent to the stored information, identifying, from among the multiple web sites, another web site that the stored information indicates corresponds to the other electronic messaging source address from which the new electronic message was sent; and
- as a consequence of both determining that the new electronic message includes content to be added to a web site and identifying the other web site that the stored information indicates corresponds to the other electronic messaging source address from which the new electronic message was sent, adding the new content to be added to the other web site.

20. A computer-implemented method comprising:
- storing, using a data storage system, information concerning a plurality of web pages and a plurality of user identities;
- receiving an electronic message;
- determining a user identity associated with the received electronic message;
- identifying a command, included in the received electronic message, to add content;
- based on the command, identifying textual content included in the received electronic message to be added to at least one web page;
- comparing the user identity associated with the received electronic message to the stored information to identify, from among the plurality of web pages, a particular web page associated with the user identity; and
- adding the identified textual content to the identified web page as a web log entry on the web page.

21. The method of claim 20, wherein adding the identified content includes:
- reformatting the identified content before adding the identified content to the identified webpage; and
- adding the reformatted content to the identified web page.

22. The method of claim 21, wherein reformatting the identified content includes time stamping the identified content.

23. The method of claim 20, wherein the user identity includes at least one of an e-mail address, a username, or a screen name.

24. The method of claim 20, wherein the electronic message includes an instant message.

25. The method of claim 20, wherein the content to be added to the web page includes at least one of textual content, audio content, image content, or video content.

26. The method of claim 20, further comprising sending an electronic message to one or more additional user identities announcing the addition of the content to the identified web page.

* * * * *